US012797271B2

(12) United States Patent
Bernal et al.

(10) Patent No.: US 12,797,271 B2
(45) Date of Patent: Nov. 17, 2026

(54) CONFIGURABLE ZERO-TRANSFER PATIENT APPARATUS FOR USE IN A MEDICAL TREATMENT FACILITY

(71) Applicant: Blue Ocean BBB, LLC, Houston, TX (US)

(72) Inventors: Rafael R. Bernal, Houston, TX (US); Marcos V. Masson, Houston, TX (US)

(73) Assignee: Blue Ocean BBB, LLC, Houston, TX (US)

(*) Notice: Subject to any disclaimer, the term of this patent is extended or adjusted under 35 U.S.C. 154(b) by 0 days.

(21) Appl. No.: 19/133,144

(22) PCT Filed: Dec. 7, 2023

(86) PCT No.: PCT/US2023/082894
§ 371 (c)(1),
(2) Date: May 27, 2025

(87) PCT Pub. No.: WO2024/129503
PCT Pub. Date: Jun. 20, 2024

(65) Prior Publication Data

US 2026/0144687 A1 May 28, 2026

Related U.S. Application Data

(60) Provisional application No. 63/386,905, filed on Dec. 11, 2022.

(51) Int. Cl.

| | |
|---|---|
| ***A61G 5/12*** | (2006.01) |
| ***A61G 5/00*** | (2006.01) |
| ***A61G 5/10*** | (2006.01) |

(52) U.S. Cl.
CPC .............. *A61G 5/124* (2016.11); *A61G 5/006* (2013.01); *A61G 5/1059* (2013.01);
(Continued)

(58) Field of Classification Search
CPC .... F16C 33/805; F16C 33/32; F16C 2326/02; F16C 2326/20; F16C 33/768; F16C 35/067
See application file for complete search history.

(56) References Cited

U.S. PATENT DOCUMENTS 4,170,368 A * 10/1979 Southward .............. A61G 5/00 414/921
4,324,414 A * 4/1982 Wilkes .................. A61G 5/006 180/7.1

(Continued)

FOREIGN PATENT DOCUMENTS

BR 102017012651 A2 * 1/2019 ............ A61H 1/001
BR 102017012651 B1 * 2/2024 ............ A61H 1/001

OTHER PUBLICATIONS

Translation of BR 102017012651 B 1;Feb. 20, 2024 (Year: 2024).*
(Continued)

*Primary Examiner* — Jason D Shanske
*Assistant Examiner* — Shams Dhanani
(74) *Attorney, Agent, or Firm* — Lewis & Reese, PLLC

(57) ABSTRACT

A zero-transfer patient apparatus is disclosed that can be used to carry a patient through all phases of a healthcare environment such as a surgical facility. The zero-transfer patient apparatus is configurable into a wheelchair, a gurney, a bed, and an operating room table, and can be further manipulated (e.g., tilted) when configured into these modes in various manual and automated manners that complement patient treatment. The patient upon entering the facility can be placed in the disclosed zero-transfer patient apparatus and moved as necessary around the facility (the waiting area, pre-op, surgery, post-op, etc.) without the need to transfer the patient from one apparatus to another. This provides improved safety for the patient and servicing clinicians. This also reduces complexity and cost at the facility, which need
(Continued)

not be burdened with having several different apparatuses (separate wheelchairs, beds, etc.) each with limited functionalities.

19 Claims, 20 Drawing Sheets

(52) U.S. Cl.
CPC ........... *A61G 5/1067* (2013.01); *A61G 5/121* (2016.11); *A61G 5/122* (2016.11); *A61G 5/127* (2016.11); *A61G 2203/12* (2013.01)

(56) References Cited

U.S. PATENT DOCUMENTS

| | | | | | |
|---|---|---|---|---|---|
| 4,592,562 | A * | 6/1986 | Strautnieks | A61G 5/12 | 414/921 |
| 4,593,929 | A * | 6/1986 | Williams | A61G 5/0825 | 297/184.12 |
| 5,209,223 | A * | 5/1993 | McGorry | A63B 23/00 | 482/133 |
| 5,335,651 | A * | 8/1994 | Foster | A61G 7/0528 | 5/503.1 |
| 5,611,096 | A * | 3/1997 | Bartlett | A61G 7/001 | 5/713 |
| 5,860,664 | A * | 1/1999 | Smith | A61G 5/1002 | 280/647 |
| 7,036,838 | B2 * | 5/2006 | Leffler | A61G 5/12 | 280/250.1 |
| 8,205,297 | B2 * | 6/2012 | Fallshaw | B60B 33/0073 | 16/35 R |
| 9,713,559 | B2 * | 7/2017 | Hough | A47C 1/032 | |
| 10,381,116 | B2 * | 8/2019 | Zerhusen | G06Q 30/04 | |
| 10,893,988 | B2 * | 1/2021 | Tessmer | A61G 13/104 | |
| 11,304,865 | B2 * | 4/2022 | Furman | A61G 7/08 | |
| 2002/0059679 | A1 * | 5/2002 | Weismiller | A61G 7/0514 | 5/610 |
| 2002/0111701 | A1 * | 8/2002 | Borders | A61G 13/107 | 700/60 |
| 2004/0051279 | A1 * | 3/2004 | Grant | A61G 5/1059 | 280/638 |
| 2007/0189461 | A1 * | 8/2007 | Sommer | A61N 5/1049 | 378/178 |
| 2007/0255190 | A1 * | 11/2007 | Sadok | B25J 9/0006 | 602/24 |
| 2011/0143898 | A1 * | 6/2011 | Trees | A63B 21/1672 | 482/142 |
| 2015/0231002 | A1 * | 8/2015 | Gierse | A61G 5/1075 | 297/344.17 |
| 2016/0095773 | A1 * | 4/2016 | Ruch | G16H 40/63 | 5/616 |
| 2017/0086594 | A1 * | 3/2017 | Khandrika | A47C 17/162 | |
| 2017/0119610 | A1 * | 5/2017 | Christensen | A61G 13/08 | |

OTHER PUBLICATIONS

Translation of BR 102017012651 A2;Jan. 15, 2019 (Year: 2019).*
Overview of Trinityebc, Fallshaw, retrieved on Dec. 5, 2023 from <https://www.fallshaw.com.au/Product-range/castors/medical-castors/trinity-ebc>.
Description of Build of Trinityebc, Fallshaw, retrieved on Dec. 5, 2023 from <https://www.fallshaw.com.au/Product-range/castors/medical-castors/trinity-ebc/build>.
Description of Control System of Trinityebc, Fallshaw, retrieved on Dec. 5, 2023 from <https://www.fallshaw.com.au/Product-range/castors/medical-castors/trinity-ebc/control>.
Customer Applications of Trinityebc, Fallshaw, retrieved on Dec. 5, 2023 from <https://www.fallshaw.com.au/Product-range/castors/medical-castors/trignity-ebc/customer-applications>.
Stryker Trio Surgical Stretcher, Soma Technology, Inc., Feb. 2, 2017, 2 pages.
TransMotion Collection, Champion Manufacturing Inc., retrieved on Dec. 7, 2023 from <https://championchair.com/transmotion/>.
Eye Surgery Procedural Stretcher, Stryker, retrieved on Dec. 7, 2023 from <https://www.stryker.com/us/en/acute-care/products/eye-surgery.html>.
Operon D860 Surgical Table, Stryker, retrieved on Dec. 7, 2023 from <https://www.stryker.com/us/en/communications/products/operon-d860.html>.
Stretcher Chair—Procedural Stretcher, Stryker, retrieved on Dec. 7, 2023 from <https://www.stryker.com/us/en/acute-care/products/stretcher-chairs.html>.
International Search Report and Written Opinion regarding corresponding PCT Application No. PCT/US2023/082894, mailed Apr. 18, 2024.

* cited by examiner

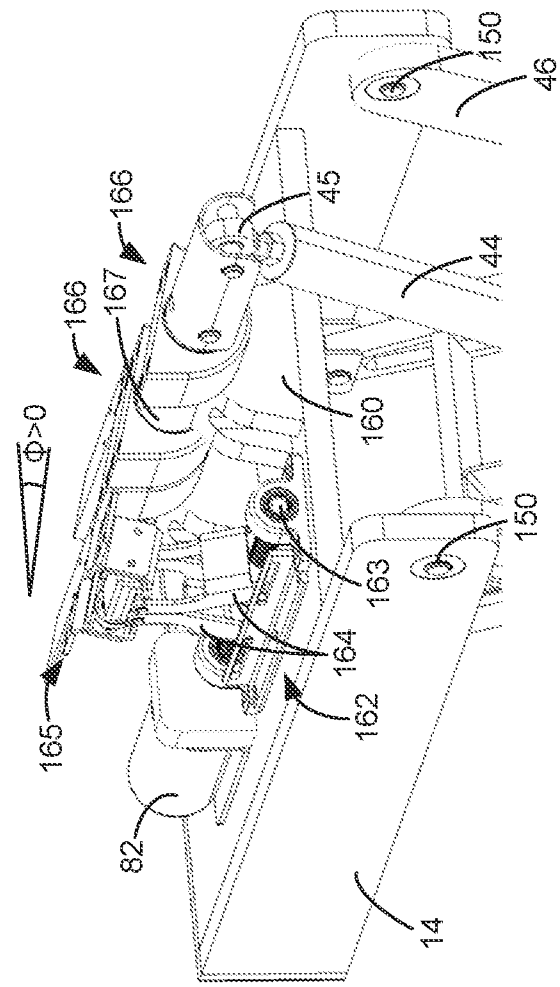
*Figure 8B*
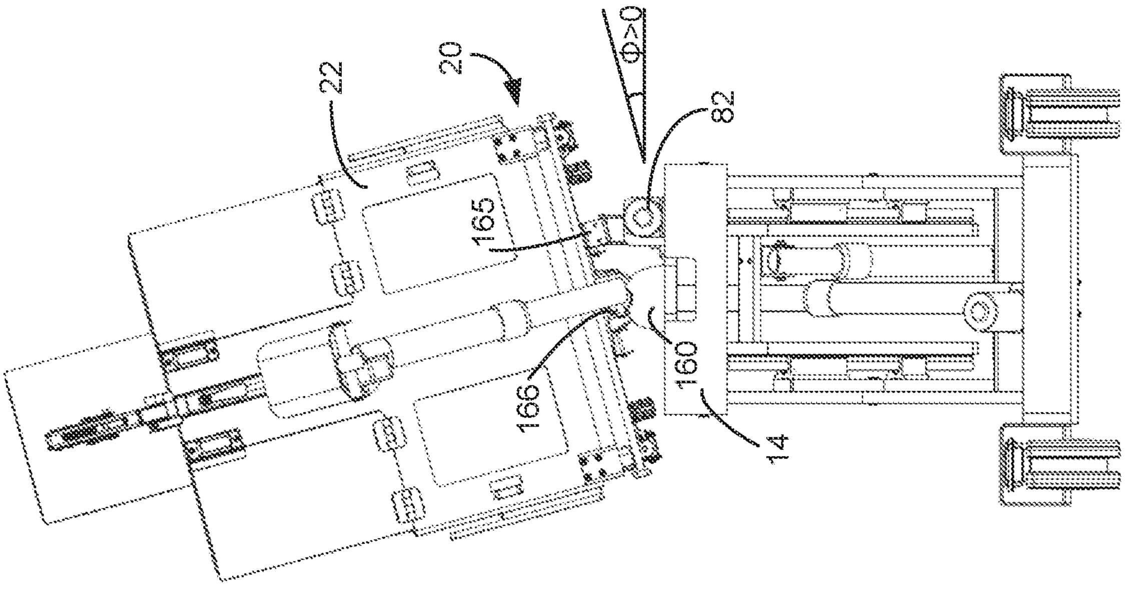

CONFIGURABLE ZERO-TRANSFER PATIENT APPARATUS FOR USE IN A MEDICAL TREATMENT FACILITY

FIELD OF THE INVENTION

This application relates to a configurable zero-transfer patient apparatus for use in a healthcare facility.

INTRODUCTION

In a healthcare environment such as a surgical center, patient transfer to and from various apparatuses can be a significant hurdle, and this is especially true in an outpatient surgical facility. Typically, a patient enters the facility and is put into a wheelchair. Later, the patient is eventually transferred to a bed, such as a bed in a "pre-op" waiting room where the patient is prepped for surgery. Thereafter, the patient may be transferred to a gurney so that they can be wheeled to the operating room (OR). Once in the operating room, the patient may again need to be transferred from the gurney to an operating room table where surgery is performed. Further patient transfer may be required after surgery is completed, and this may occur in essentially the reverse order. The patient may be transferred from the operating room table back to a gurney, where they are transferred to a "post-op" bed. Eventually, the patient will be transferred back to a wheelchair upon being discharged from the facility.

The inventors find the need to transfer the patient between various apparatuses unfortunate and inefficient. There is always a risk that the patient will be injured when being transferred from one apparatus to another, and clinicians assisting in the transfer can also be injured as well. The risk of injury is particularly acute if the patient is infirm, sedated, or particularly heavy. Patient transfers from one apparatus to another may also require a number of clinicians (e.g., one to four) depending on the circumstances, which can be a poor use of the clinicians'time.

Further problematic is the number of apparatuses that are required (e.g., wheelchairs, beds, gurneys, OR tables, etc.). Each of these apparatuses needs to be stored, cleaned, and accounted for, adding expense, delay and hassle for the facility. These problems are exacerbated when one considers that even a small surgical facility may be handling many surgeries a day, thus requiring many different apparatuses to transport patients, and many different transfers between them.

To address these issues, the inventors have developed a zero-transfer patient apparatus that can be used to carry a patient through all phases of a hospital environment such as a surgical facility. The zero-transfer patient apparatus is configurable into a wheelchair, a gurney, a bed, an operating room table, and other configurations discussed below. The apparatus can be further manipulated (e.g., tilted) when configured into these modes in various manual and automated manners that complement patient treatment. The patient upon entering the facility can be placed in the disclosed zero-transfer patient apparatus and moved as necessary around the facility (the waiting area, pre-op, surgery, post-op, etc.) without the need to transfer the patient from one apparatus to another, saving time. This provides improved safety for the patient and servicing clinicians. This also reduces clutter, complexity, and cost at the facility, which need not be burdened with having several different apparatuses (separate wheelchairs, beds, etc.) each with very specific functions.

SUMMARY

A patient apparatus for use in a medical treatment facility is disclosed, which may comprise: a seat coupled to an upper chassis; a back coupled to the seat; a lower chassis coupled to the upper chassis and comprising casters allowing the apparatus to be rolled; a first motor configured to adjust a recline angle between the back and the seat; a second motor configured to adjust a vertical height of the seat; a third motor configured to adjust a longitudinal tilt angle of the seat; and a fourth motor configured to adjust a lateral tilt angle of the seat.

In one example, the apparatus further comprises left and right leg supports coupled to the seat. In one example, the left and right leg supports are each independently configurable to establish a leg support angle of zero degrees and a maximum leg support angle between the seat and the leg support. In one example, the left and right leg supports are each independently configurable to establish at least one other leg support angle between zero degrees and the maximum leg support angle. In one example, the left and right leg supports are each independently manually configurable to establish the leg support angle.

In one example, the apparatus further comprises left and right shoulder supports coupled to the back. In one example, the left and right shoulder supports are each independently configurable to either cover or expose a patient's left or right shoulder respectively. In one example, the left and right shoulder supports are coupled to the back by hinges. In one example, the left and right shoulder supports are locked to the back when covering the patient's left or right shoulder respectively, and wherein the left and right shoulder supports are unlocked to the back and bend at the hinge when exposing the patient's left or right shoulder respectively. In one example, the left and right shoulder supports are each independently manually configurable to either cover or expose the patient's left or right shoulder.

In one example, the apparatus further comprises a head support coupleable to the back. In one example, the head support is configurable to (i) adjust a distance between the head support and the back, and/or (ii) adjust an anterior position of the head support with respect to the back. In one example, the head support is removable from the back.

In one example, the apparatus further comprises left and right safety rail mechanisms configured to extend vertically upwards at left and right edges of the seat respectively. In one example, the left and right safety rail mechanisms are affixed underneath the seat.

In one example, the apparatus further comprises an electronics module comprising control circuitry to control operation of the first, second, third and fourth motors. In one example, the electronics module comprises a user interface to allow a user to operate the first, second, third and fourth motors. In one example, the user interface comprises a plurality of inputs to allow a user to configure the apparatus into a plurality of configurations. In one example, the upper chassis comprises the electronics module. In one example, the electronics module comprises telemetry circuitry configured to wirelessly communicate with a computing device to allow the apparatus to be controlled by the computing device, or to allow the apparatus to report information to the computing device. In one example, the electronics module comprises a rechargeable battery.

In one example, the lower chassis is coupled to the upper chassis by a scissor lift mechanism. In one example, the second motor is configured to adjust the vertical height of the seat by vertically extending or retracting the scissor lift mechanism. In one example, the third motor is configured to adjust the longitudinal tilt angle of the seat by rotating the seat around a rotation point coupled to the scissor lift mechanism. In one example, the fourth motor is configured to adjust the lateral tilt angle of the seat via a scissor jack coupled to an underside of the seat. In one example, the apparatus further comprises a pillow block connected to an underside of the seat, wherein the scissor jack is configured to cause the pillow block to rotate around a shaft laterally centered with respect to the seat. In one example, the casters are configured to detect that the apparatus is on an inclined plane, and to lock to prevent rolling.

A patient apparatus for use in a medical treatment facility is disclosed, which may comprise: a seat coupled to an upper chassis; a back coupled to the seat; and a lower chassis coupled to the upper chassis and comprising casters allowing the apparatus to be rolled; wherein the apparatus is configurable using into a plurality of configurations, wherein the configurations comprise: a wheelchair mode in which the seat is substantially horizontal and the back is configured at a substantially vertical recline angle with respect to the seat; a supine mode wherein the seat and back are substantially parallel and are longitudinally inclined at a substantially horizontal longitudinal tilt angle; a Trendelenburg or reverse Trendelenburg mode wherein the seat and back are substantially parallel and wherein the seat and back are longitudinally inclined at a substantially non-horizontal longitudinal tilt angle; and a lateral tilt mode wherein the seat and back are laterally inclined at a substantially non-horizontal lateral tilt angle.

In one example, the supine mode configures the apparatus in one or more of a pre-op bed, a post-op bed, a gurney, and a surgical table. In one example, the configurations further comprise: a storage mode wherein a height between the upper and lower chassis is minimized. In one example, in the storage mode, the seat and back are substantially parallel and are longitudinally inclined at a substantially horizontal longitudinal tilt angle. In one example, in the storage mode, the seat and back are laterally inclined at a substantially horizontal lateral tilt angle.

In one example, the apparatus further comprising left and right leg supports coupled to the seat, wherein in the storage mode, the left and right leg supports are established at a leg support angle of approximately ninety degrees between the seat and the leg support. In one example, the apparatus further comprises a head support coupleable to the back, wherein in the storage mode, the head support is removeable from the back.

In one example, the apparatus further comprises left and right leg supports coupled to the seat, wherein in any one or more of the wheelchair mode, the supine mode, the Trendelenburg or reverse Trendelenburg mode, or the lateral tilt mode, the left and right leg supports are each independently configurable to establish a leg support angle of zero degrees and a maximum leg support angle between the seat and the leg support. In one example, the left and right leg supports are each independently configurable to establish at least one other leg support angle between zero degrees and the maximum leg support angle.

In one example, the apparatus further comprises a head support coupled to the back.

In one example, the configurations further comprise: a beach chair mode wherein the seat is longitudinally inclined at a positive non-horizontal longitudinal tilt angle, and wherein the back is substantially perpendicular with the seat.

In one example, the apparatus further comprises left and right shoulder supports coupled to the back, wherein the left and right shoulder supports are each independently configurable to either cover or expose a patient's left or right shoulder respectively. In one example, the left and right shoulder supports are locked to the back when covering the patient's left or right shoulder respectively, and wherein the left and right shoulder supports are unlocked to the back when exposing the patient's left or right shoulder respectively.

In one example, the apparatus further comprises left and right safety rail mechanisms configured to extend vertically upwards at left and right edges of the seat respectively. In one example, the left and right safety rail mechanisms are affixed underneath the seat.

In one example, the apparatus further comprises an electronics module comprising a user interface to configure the apparatus in the wheelchair mode, the supine mode, the Trendelenburg or reverse Trendelenburg mode, or the lateral tilt mode. In one example, the upper chassis comprises the electronics module. In one example, the electronics module comprises telemetry circuitry configured to wirelessly communicate with a computing device. In one example, the electronics module comprises a rechargeable battery.

In one example, the lower chassis is coupled to the upper chassis by a scissor lift mechanism configured to adjust the vertical height of the seat. In one example, in the Trendelenburg or reverse Trendelenburg mode, the seat is configured to rotate around a rotation point coupled to the scissor lift mechanism to establish the substantially non-horizontal longitudinal tilt angle. In one example, in the lateral tilt mode, a scissor jack coupled to an underside of the seat is configured to establish the substantially non-horizontal lateral tilt angle.

BRIEF DESCRIPTION OF THE DRAWINGS

FIGS. 8A-8C show control of the lateral tilt motor to adjust a lateral tilt angle of the apparatus.

DETAILED DESCRIPTION

Figure 1B:
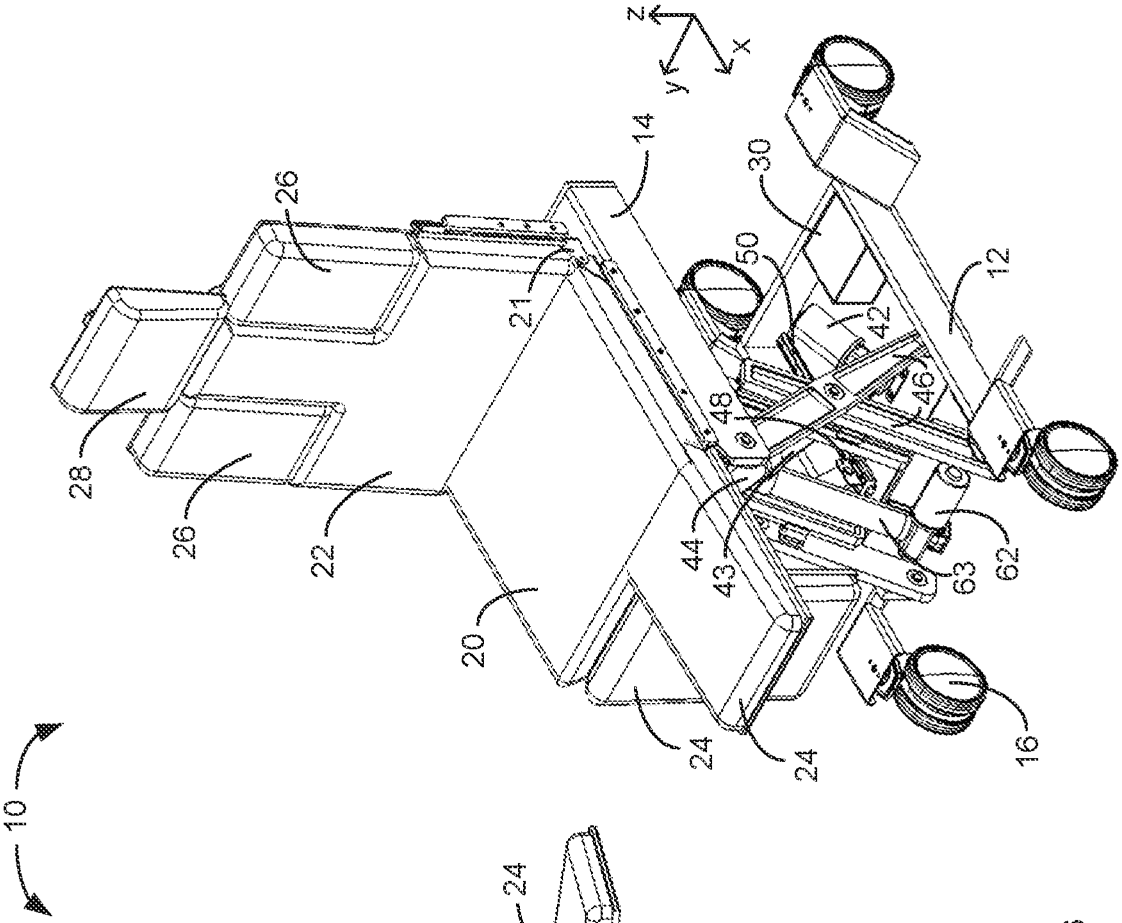
FIGS. 1A-1E show various views of the disclosed zero-transfer patient apparatus.
Figure 1A:
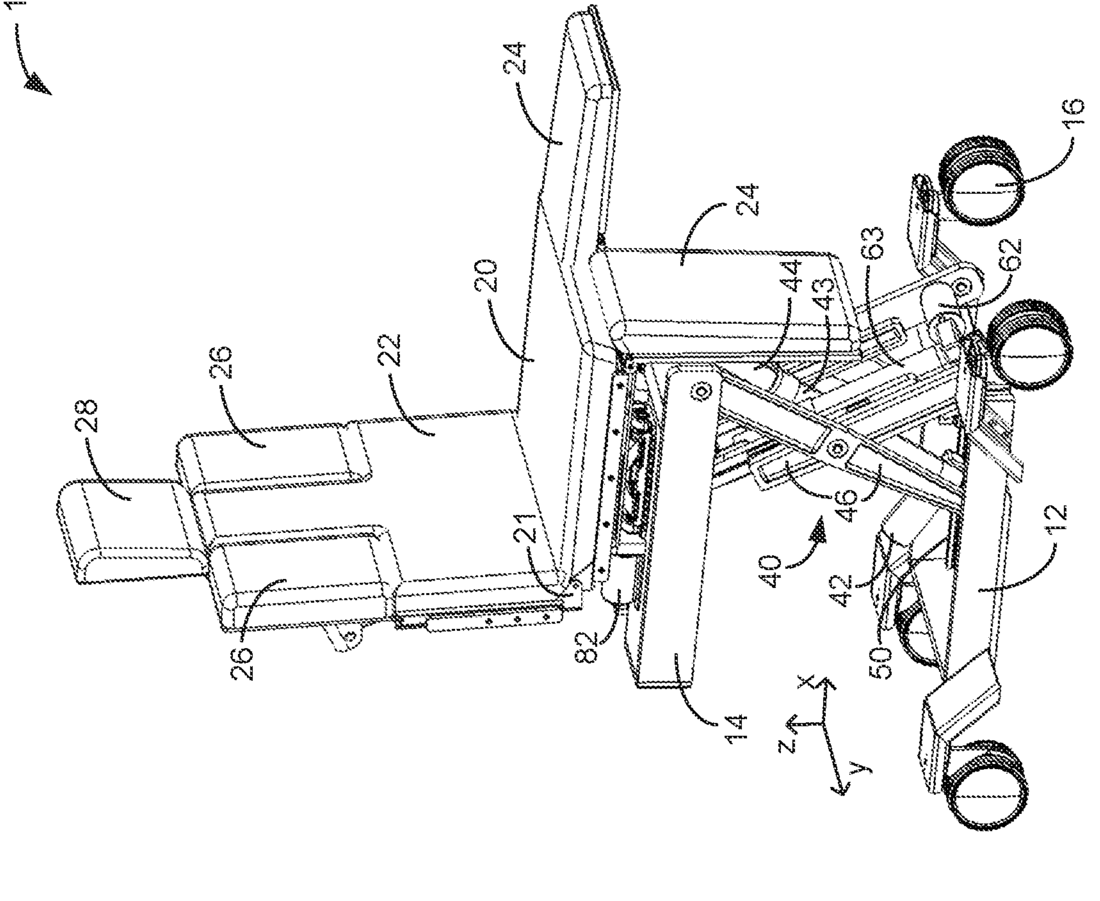

An example of the disclosed zero-transfer patient apparatus 10 for transporting a patient through different phases of a healthcare facility is shown in FIGS. 1A-1E in different views. The apparatus 10 is configurable into different positions, but in FIGS. 1A-1E is largely shown configured as a wheelchair. The apparatus 10 includes a lower chassis 12 to which casters 16 are attached, and an upper chassis 14. Although not shown, the casters 16 can be locked or unlocked to allow the zero-transfer patient apparatus 10 to be moved freely or locked in position, as explained more fully below. The upper and lower chassis 12 and 14 are connected by a scissor lift mechanism 40, as explained further below. As will become clear upon describing the various components of the zero-transfer patient apparatus 10, the apparatus is relatively light weight, although sturdy in construction and thus able to hold and transport even the heaviest of patients.

Figure 1D:
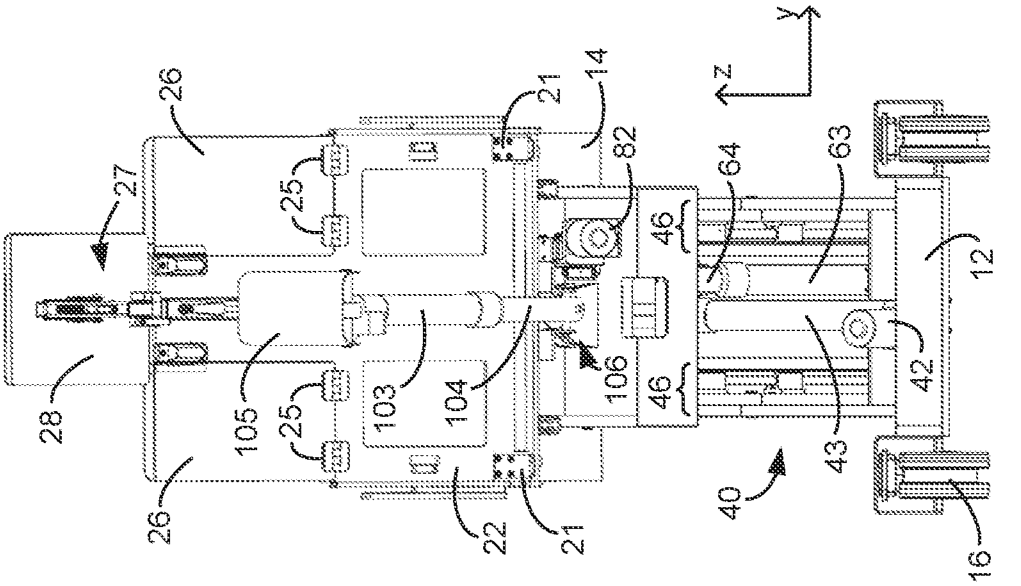
Figure 1C:
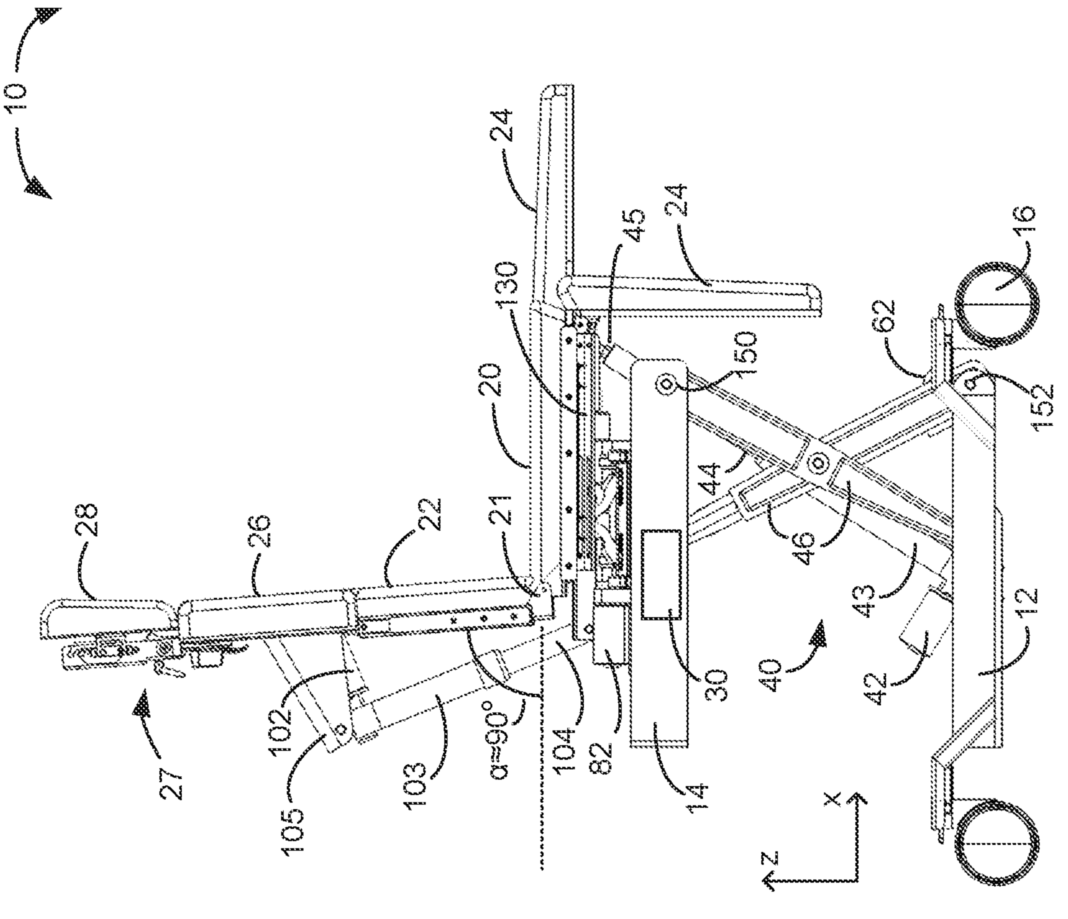
Figure 1E:
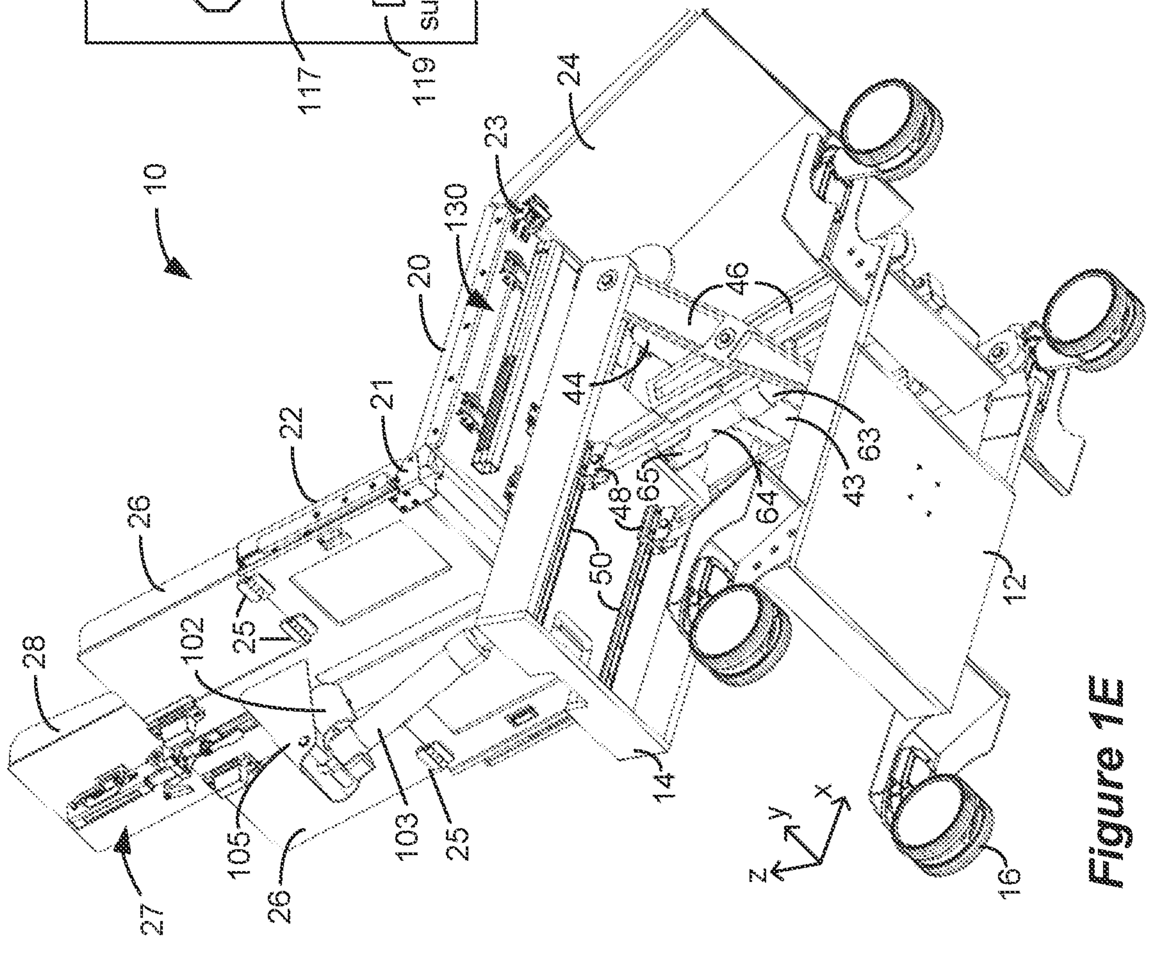

A seat 20 is affixed to components in the upper chassis 14 as explained further below, and a back 22 is connected to the seat 20 by one or more hinges 21 (FIGS. 1C-1E). Right and left leg supports 24 are connected to the seat 20 by one or more hinges 23, as best shown in the underside view of FIG. 1E. Right and left shoulder supports 26 are connected to the back 22 by one or more hinges 25 (FIGS. 1D & 1E). A head support 28 is also affixed to the back 22 by a head support adjustment mechanism 27 (FIGS. 1C-1E). The seat 20, back 22, leg supports 24, shoulder supports 26, and head support 28 are preferably padded for patient comfort, although these components may also be rigid. Right and left extendable safety rail mechanisms 130 are also affixed underneath the seat 20, but these are not extended in FIGS. 1A-1E, and are shown in detail later.

Components of the zero-transfer patient apparatus 10 may be moveable manually or by automated means. As depicted and discussed further below, the leg supports 24, shoulder supports 26, and the head support 28 are adjustable or removeable by a clinician manually, although these components may also be moveable by automated means in other examples.

Motors are used to move other components in the zero-transfer patient apparatus 10 in an automated fashion. For example, a scissor lift motor 42 proximate to the lower chassis 12 is used to control the scissor lift mechanism 40 to affect the height of the apparatus 10 by changing the height (z) of the upper chassis 14 and the seat 20 relative to the lower chassis 12. A longitudinal tilt motor 62 also proximate to the lower chassis 12 is used to control a longitudinal tilt (head to toe) of the apparatus 10 by controlling a longitudinal tilt angle θ between the upper and lower chassis 12 and 14 in the x-z plane (e.g., FIGS. 7A-7D). A lateral tilt motor 82 proximate to the upper chassis 14 is used to control a lateral tilt (left to right) of the seat 20 by controlling a lateral tilt angle φ between the seat 20 and the upper chassis 14 in the y-z plane (e.g., FIGS. 8A-8C). A back tilt motor 102 is used to control reclining of the back 22 by controlling a recline angle α between the back 22 and the seat 20 in the x-z plane (e.g., FIG. 1C).

Automated control of the zero-transfer patient apparatus 10 can be centralized in an electronics module 30. This electronics module 30 can be located at different locations in the zero-transfer patient apparatus 10, but in the example shown is placed within the upper chassis 14 (FIG. 1C). Electronics module 30 could also be affixed to or placed within the lower chassis 12 for example, as shown in FIG. 1B. The electronics module 30 is shown in one example in FIG. 2, and may include control circuitry 114 (e.g., a microcontroller) to integrate control of the electronics, telemetry circuitry including an antenna 112 for wireless communications along link 124, and a battery 110. Battery 110 is preferably rechargeable by plugging the zero-transfer patient apparatus 10 to a wall outlet when not in use (cabling not shown). Battery 110 preferably includes enough power to operate the control circuitry 114, telemetry circuitry associated with antenna 112, and the various motors (42, 62, 82, 102) in the apparatus 10.

The electronics module 30 may include a user interface to control the various manners in which the apparatus 10 can move. For example, buttons 116 are shown that allow a user to increase or decrease Height z (controlled by motor 42), Trendelenburg (longitudinal) angle θ (controlled by motor 62), Lateral Tilt angle φ (controlled by motor 82), and Recline angle α (controlled by motor 102). Pre-programmed configuration buttons 119 may also allow for common configurations of the apparatus 10 to be established, such as supine mode (e.g., FIG. 7A), beach chair mode (e.g., FIG. 9B), wheelchair mode (e.g., FIG. 9A), Trendelenburg mode (e.g., FIG. 7B), and reverse Trendelenburg mode (e.g., FIG. 7C). Selection of these modes via buttons 119 will control the motors with default parameters (z, θ, φ, α) necessary to configure the apparatus 100 into the appropriate shape without need for the clinician to adjust these parameters individually (at buttons 116). Buttons 119 for each mode may be adjustable or programmable with different default parameters, or to define new configurations (modes) for the apparatus. Although not shown, one skilled with understand that the electronics module 30 can be coupled to the various motors and the casters 16 in the apparatus 10 by cabling (e.g., wires).

Figure 2:
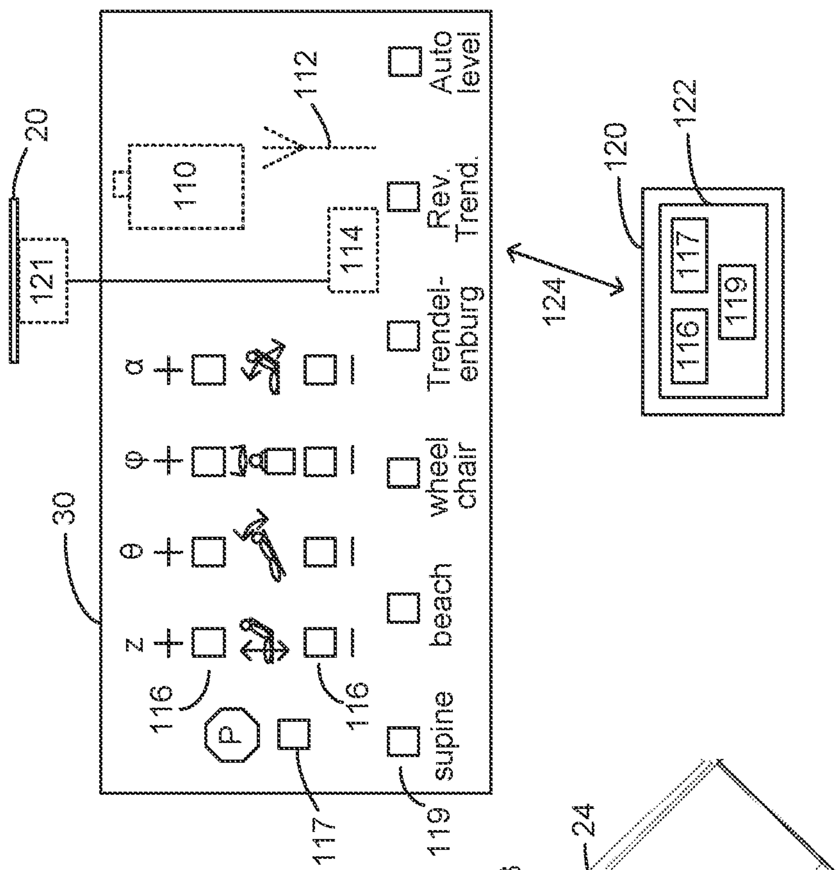
FIG. 2 shows details of the electronics module of the apparatus, and wireless communication with a computing device.

The electronics module 30 may additionally interface with a means to sense the orientation and positioning of the seat 20, such as a 3-axis accelerometer 121, which as shown in FIG. 2 may be affixed underneath the seat. This accelerometer 121 can communicate via wiring with the control circuitry 114 in the electronics module 30 to inform the module, among other things, of the current longitudinal tilt angle θ and the lateral tilt angle φ of the seat 20. This can be useful to verify that the seat 20 is indeed moving as it should, for example, as prescribed by buttons 116. Additionally, the feedback provided by the accelerometer 121 can be used by the control circuitry 14 to automatically level the seat 20 (i.e., set θ=φ=0). This can occur via selecting an auto level input on the electronic module 30, which as shown can comprise one of the pre-programmed configuration buttons 119. When this auto level button is selected, the control circuitry 114 can control motors 62 and 82 to vary these angles until the accelerometer 121 reports that they have been zeroed. Accelerometer 121 can also more generally inform the control circuitry of how the apparatus is moving.

In one example, the casters 16 may be electrically controllable, and may comprise TrinityEBC™ casters available from Fallshaw Group. These casters 16 may include automatic breaking and intuitive steering, as explained further at https://www.fallshaw.com.au/product-range/castors/medical-castors/trinity-ebc. Such casters 16 decide for themselves, from a pattern of movement, where the user whishes to steer (e.g., self-aligning) by controlling a built-in three-way locking system in a smart way. For example: for long straight-path movement, only two of the casters will have an active directional lock, whereas the other two will be free to swivel and travel in any direction; on the other hand, the casters will recognize when fine adjustments are needed (e.g., entering an elevator) and deactivate all swivel locks (see, e.g., U.S. Pat. No. 8,205,297). As such, an electronically controlled set of casters 16 helps prevent patient falls by automatically applying the brakes when the apparatus 10 has been stationary for a programmed time (e.g., 60 seconds). Additionally, such casters 16 can be electrically controlled to lock or unlock the wheels. In this regard, the electronics module 30 can include a button 117 to allow the wheels to be locked or unlocked. Additionally, the casters 16, with the electronics module 30, may preferably sense when the apparatus 10 is on an inclined plane and may lock automatically when it has been stationary for a programmed time (e.g., 10 seconds). The casters 16, with the electronics module 30, may also be configured to slow down rotation (partially lock) when the apparatus 10 is on an inclined terrain, or when a specific speed and/or acceleration for the apparatus has been exceeded. Casters 16 also include mechanical pedals which can be foot operated to lock or unlock rotation of the wheels of the casters (not shown).

Wireless link 124 is preferably bi-directional, and allows for remote control and monitoring of the zero-transfer patient apparatus 10. For example, FIG. 2 shows a computing device 120 communicating with the electronics module 30 via link 124. This computing device 120 is preferably portable (e.g., a tablet or smart phone), but could also comprise any generic computing device, such as a PC or a server. As shown, the computing device 120 includes a graphical user interface (GUI) 122 to allow a user to control the various manners in which the apparatus can move (e.g., z, θ, φ, α). In this regard, the GUI 122 can include controls that mimic the controls provided on the electronics module 30 (e.g., 116, 117, 119). Wireless link 124 can also be used to update the firmware of the control circuitry 114 using the computing device 120.

Bi-directional link 124 further allows the electronics module 30 to report information to the computing device 120, and many different types of information may be so reported. For example, such information could include patient weight (as may be measured via load cells in the apparatus, not shown), information regarding location of the apparatus in the treatment facility (e.g., whether in pre-op, post-op, surgery, etc.), times or durations that the apparatus has been deployed at such locations, etc. Such information can provide useful input to tracking software typically present in a computing device 120 used in a treatment facility, which can be used by administrators to understand the current treatment stage of each of the patient at the facility, and whether treatment is running ahead of or behind schedule, etc. Tracking the location of the apparatuses 10 at a facility is also useful to inventory the apparatuses 10 that may be deployed at a facility. In this regard, the electronics module 30 can additionally include locating means, such as GPS circuitry, so that the locations of particular apparatuses can be shown on the computing device 120. Wireless link 124 may operate in accordance with any suitable communication standard, such as Bluetooth, Wi-Fi, and the like. Although not shown, link 124 could also comprise a wired link.

Components that are manually moveable in the zero-transfer patient apparatus 10 are discussed next, followed by discussion of components that are moveable in an automated fashion.

Figure 3B:
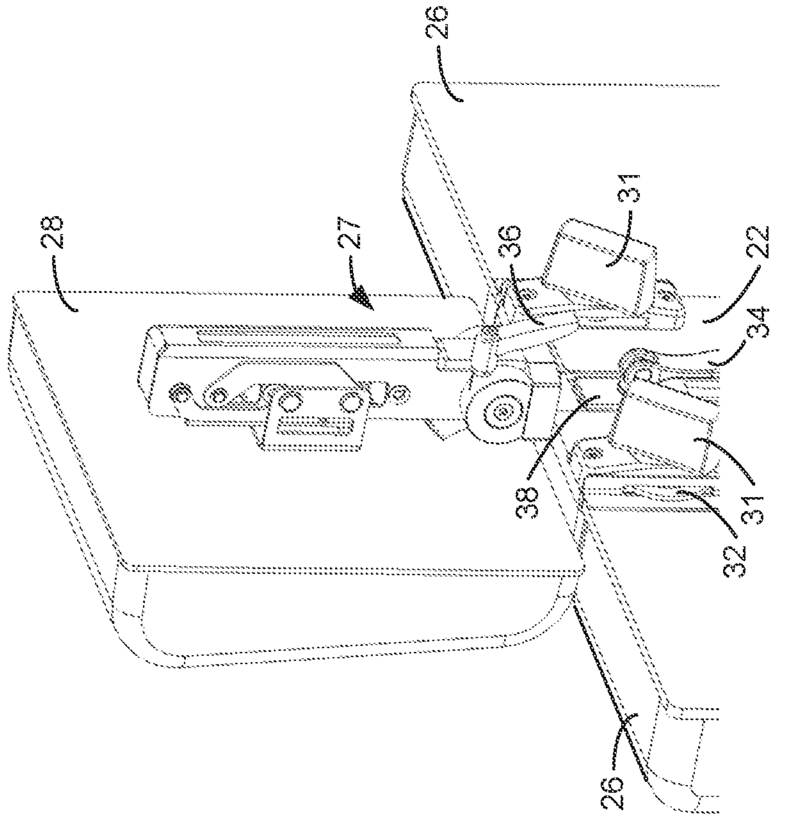
FIGS. 3A-3E show manners in which the head support and the right and left shoulder supports of the apparatus can be moved.
Figure 3A:
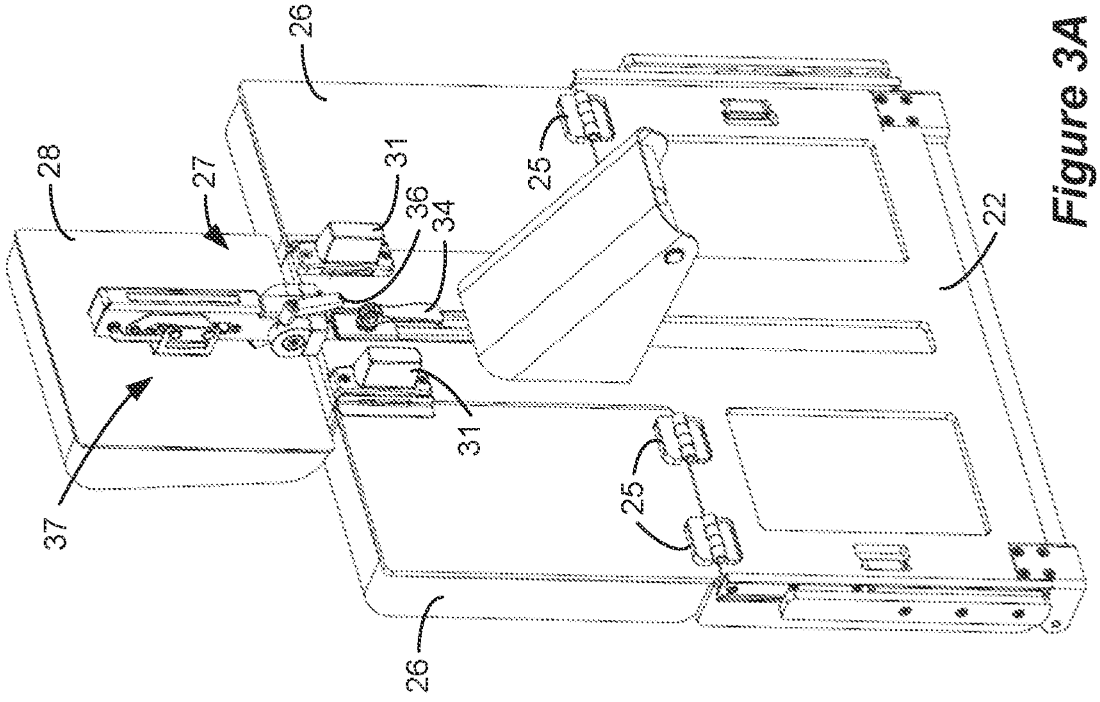
Figure 3D:
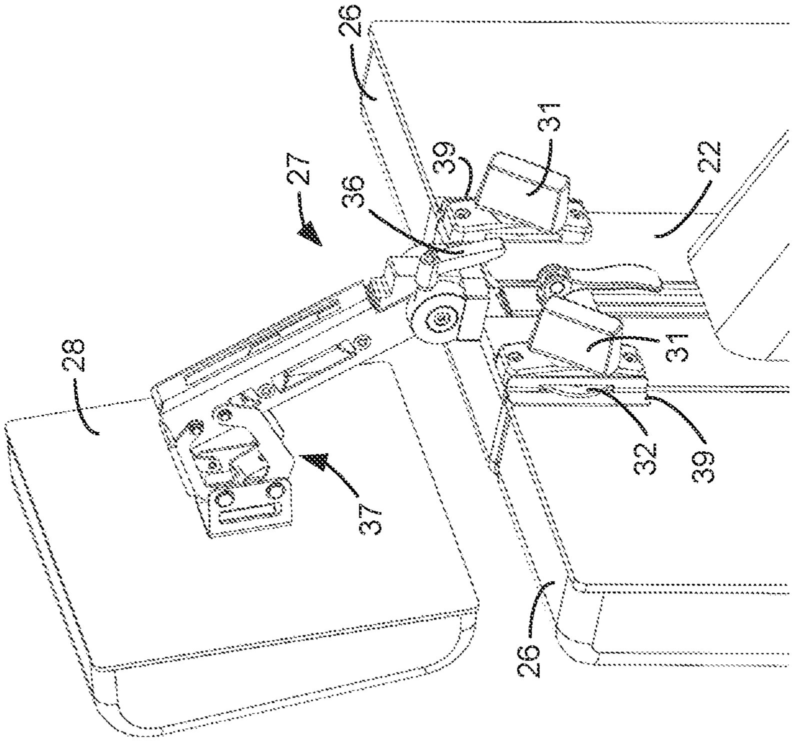
Figure 3C:
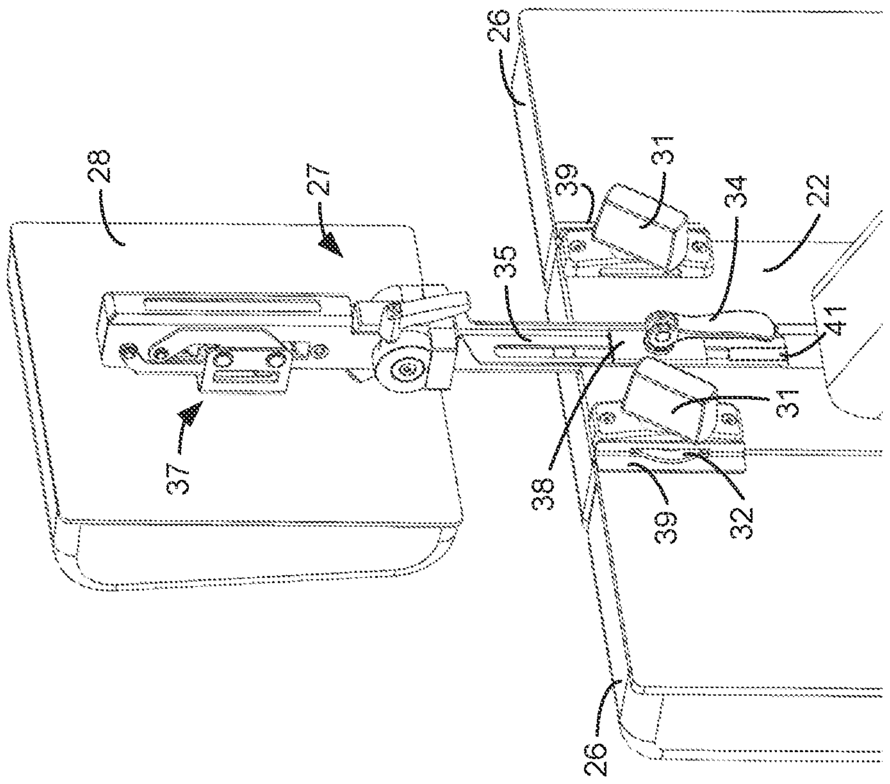

FIGS. 3A-3E show details concerning how the head support 28 and right and left shoulder supports 26 can be moved manually in the zero-transfer patient apparatus 10. The head support 28 is preferably moveable in two ways to set a position of the patient's head relative to the back 22 in accordance with a head support adjustment mechanism 27. This mechanism 27 includes a head support extension lock 34, which can be released to allow the head support 28 to move upwards parallel to the back 22 to adjust a distance between the head support 28 and the back 26, as best shown in FIG. 3C. When the lever of the lock 34 is released and turned (loosened), friction between a plate 38 and a head support extension 35 affixed to the head support 28 is relieved, allowing the extension 35 to slide relative to the plate 38, and for the head support 28 to be placed at an appropriate distance relative to the back 22. Once so positioned, the lever of the lock 34 can be turned (tightened) to reestablish friction between the plate 38 and the extension 35, which holds the head support 28 firmly in place. When the lock 34 is released, the extension 35 can also be slid free of the plate 38, which allows the head support 28 to be completely removed from the back 22. If it is desirable to remove the head support 28, a slot 41 in the extension 35 can be extended as shown in dotted lines, or the lock 34 can be completely screwed loose and freed from the apparatus 10. As discussed later (FIG. 6), removing the head support 28 can be helpful when storing or shipping the zero-transfer patient apparatus 10, or in the event that the clinician needs unencumbered access to the patient's head (e.g., during surgery).

Head support adjustment mechanism 27 also includes a head support tilt lock 36, which when released allows the head support 28 to move anteriorly (forward relative to the patient) to set an anterior position of the head support 28 with respect to the back 26, as shown in FIG. 3D. When the lever of the lock 36 is released, a four-bar linkage 37, and associated gears in its housing, can articulate to move the head support 28 forward, and at a generally comfortable angle for the patient, as shown in FIG. 3D. The four-bar linkage 37 and associated gears could also be substituted with a pulley and belt system in other examples. Once the head support 28 is positioned, the lock 36 may be engaged to fix this position. Head support adjustment mechanism 27 is just an example, and could be changed to move or remove the head support 28 if apparatus 10 is used in different contexts (e.g., for different types of treatment). Especially if the head support 28 is made removeable, the apparatus 10 could also include a number of different head supports 28 (each with different adjustments mechanisms 27) to allow a patient to have his head/neck aligned in different manners.

Figure 3E:
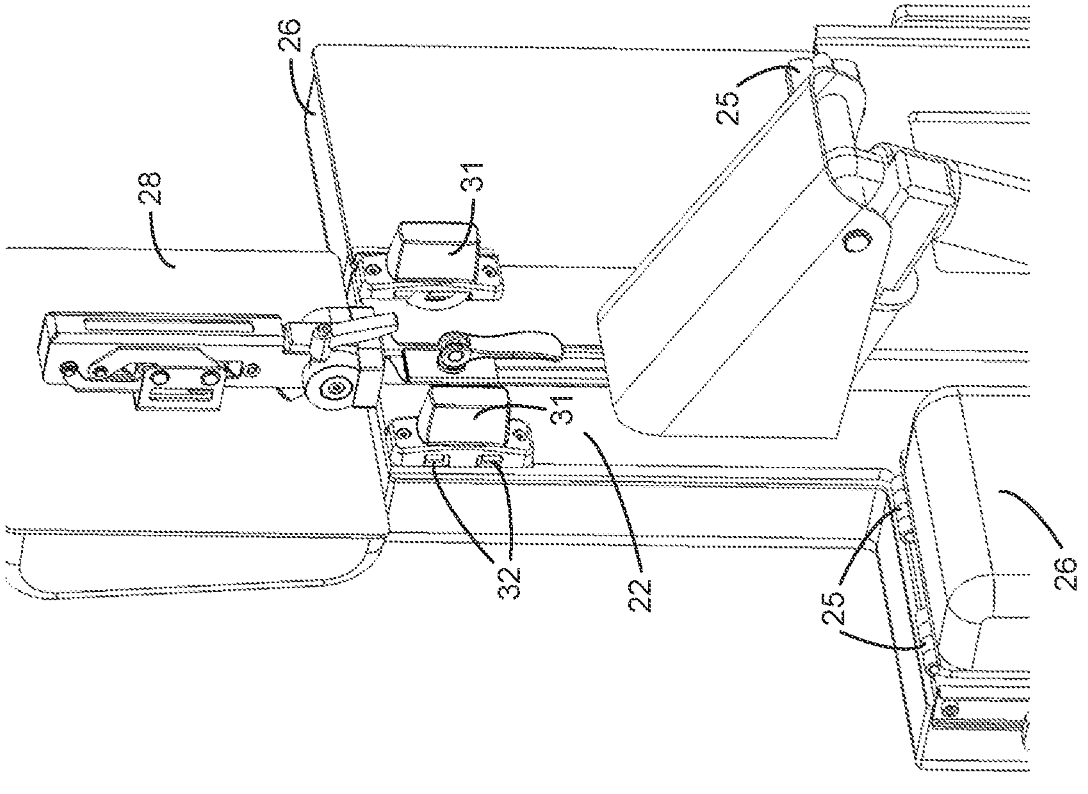

The right and left shoulder supports 26 can be moved in the zero-transfer patient apparatus 10 via rotatable shoulder locking knobs 31 whose housing are affixed to the back 22. As shown in FIGS. 3C and 3D, knobs 31 are affixed to shoulder locks 32 within their housings. The shoulder locks 32 are not rotationally symmetric, and so when the knobs 31 are turned, larger-radius portions of the shoulder locks 32 protrude from the housing and pass through slots in brackets 39 affixed to the shoulder supports 26, as shown in FIGS. 3C and 3D. This connection between the shoulder locks 32 and the slots in brackets 39 prevents the shoulder supports 26 from moving: that is, the shoulder supports 26 are unable to pivot at the hinges 25 that connect the shoulder supports 26 to the back 22. To unlock and move a shoulder support 26, a knob 31 can be turned such that a smaller-radius portion of the shoulder lock 32 presents that is not large enough to pass through the slot in the associated bracket 39, as shown in FIG. 3E. This lack of contact allows the shoulder support 26 to move and fold downward at hinges 25, as shown in FIG. 3E.

FIG. 3E shows the release and movement of only one of the shoulder supports 26. However, both shoulder supports 26 can also be moved while still supporting the patient, because a portion of the back 22 intervenes between the two supports 26. This back portion is generally in line with the patient's spine, and able to support the patient even when both supports 26 have been moved. That the shoulder supports 26 are moveable to either cover or expose a patient's left or right shoulder is preferable, as this can provide the clinician better access to the patient (e.g., during shoulder surgery). Although FIGS. 3A-3E show that the shoulder supports are merely moveable, they can also be completely removeable from the zero-transfer patient apparatus 10 in other examples.

Figure 4B:
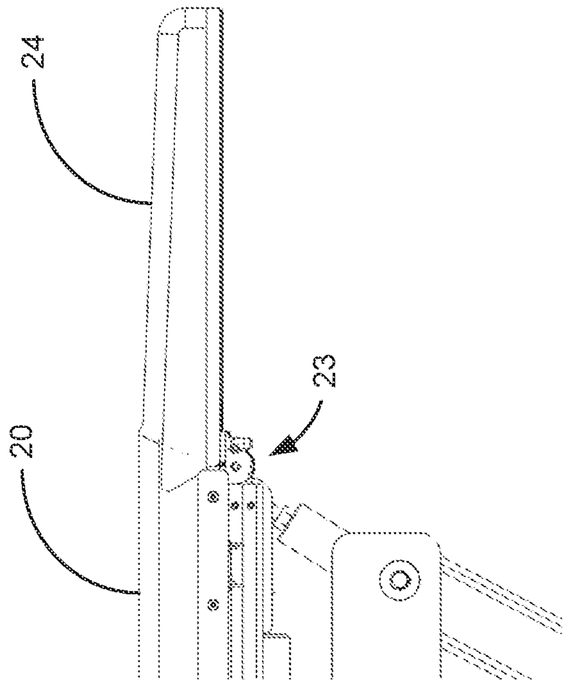
FIGS. 4A-4D show manners in which the right and left leg supports of the apparatus can be moved.
Figure 4A:
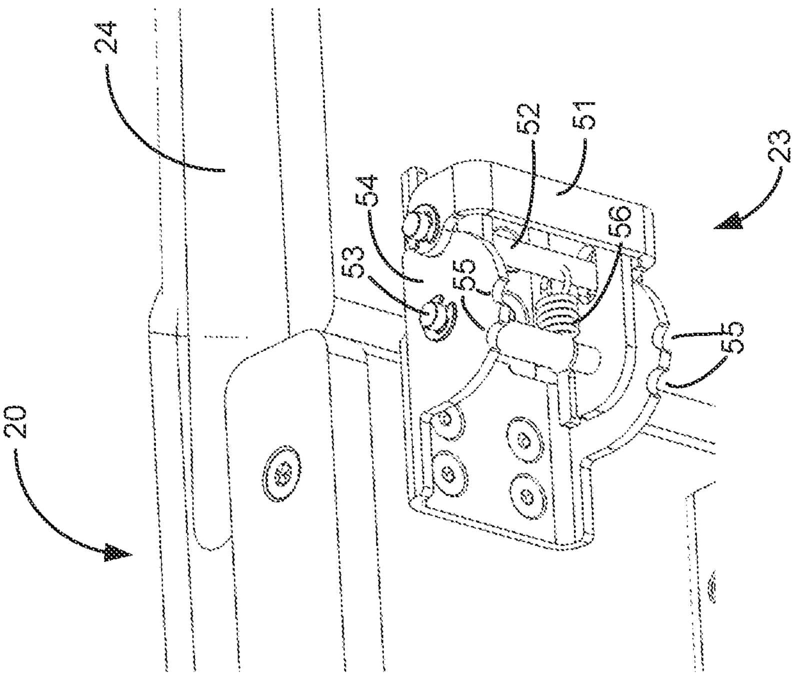
Figure 4D:
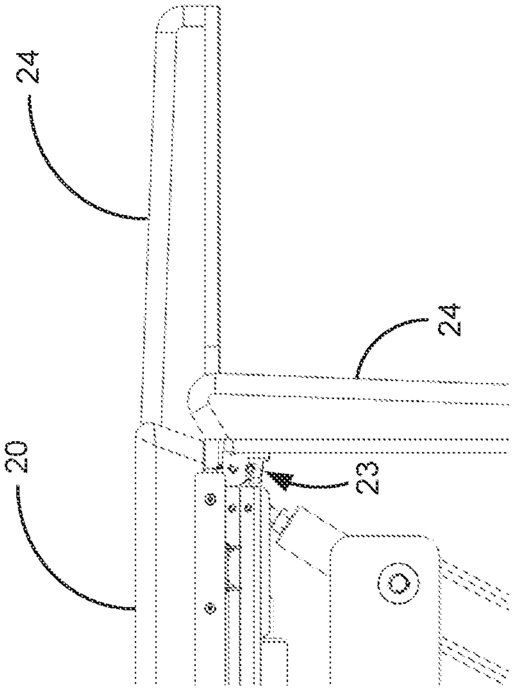
Figure 4C:
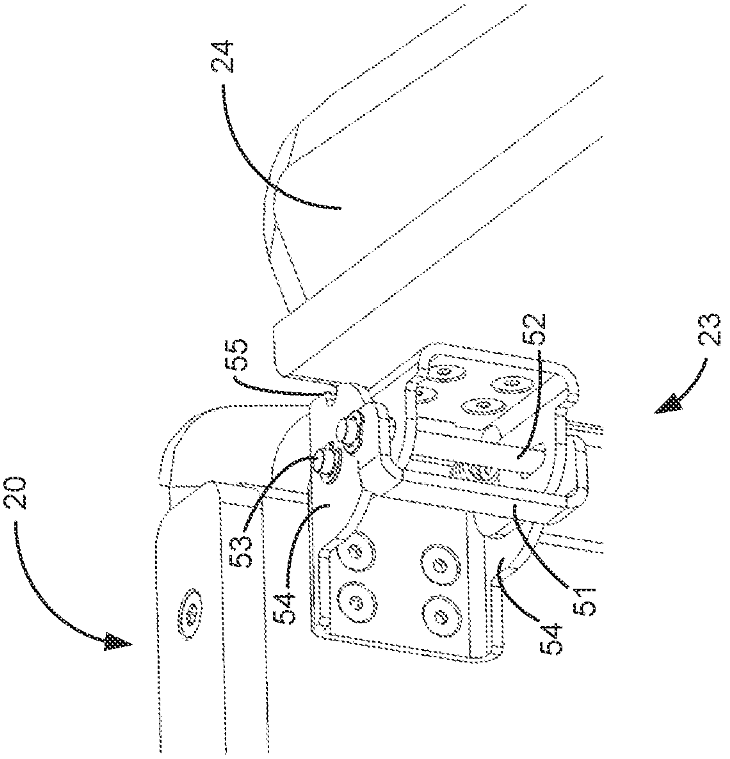

The left and right legs supports 24 are also individually manually moveable, as shown in FIGS. 4A-4D. As mentioned earlier, the leg supports 24 are attached to the seat 20 by hinges 23 (FIG. 1E) attached underneath these components. Further details of this hinge 23, and how this hinge is controllable to fix a position of a leg support 24 with respect to seat 20, are shown in FIGS. 4A-4D. FIGS. 4A and 4B show control of the hinge 23 in a manner that positions the leg supports 24 roughly parallel with the seat 20. This would be a logical configuration when the patient is lying down in the zero-transfer patient apparatus 10 (e.g., FIGS. 7A-7D). FIGS. 4C and 4D show control of the hinge 23 in a manner that positions the leg support 24 at roughly 90 degrees with the seat 20. This would be a logical configuration when the patient is sitting in the apparatus, thus allowing their patient's lower legs to rest at a more comfortable sitting position (e.g., FIG. 9A). Note that FIGS. 4C-4D show movement of only one of the leg supports 24. However, both supports 24 are moveable in the same fashion. In another example not shown, one or both leg supports 24 could also be removeable from the zero-transfer patient apparatus 10.

Details of how a leg support 24 is moveable, and can be locked at a particular angle with respect to the seat 20, are explained next. FIG. 4A shows the hinge 23, which is affixed to both the seat 20 and the leg support 24. The hinge 23 includes a handle 51 connected to a cross bar 52, both of which are affixed to a leg support 24. The cross bar 52 is biased by one or more springs 56 to a pivot rod 53 held by one or more cams 54 affixed to the seat 20. The periphery of cams 54 includes various notches 55 which hold the cross bar 52 in place to prevent the cross bar 52 from rotating around the pivot rod 53. In FIG. 4A, the cross bar 52 is held (via spring 56) in a notch 55 that is not visible (but which is visible in FIG. 4C. after the cross bar 52 has been moved). This retention of the cross bar 52 in this notch 55 holds the leg support 24 firmly at a parallel position with respect to the seat 20 in FIGS. 4A and 4B.

Figure 6:
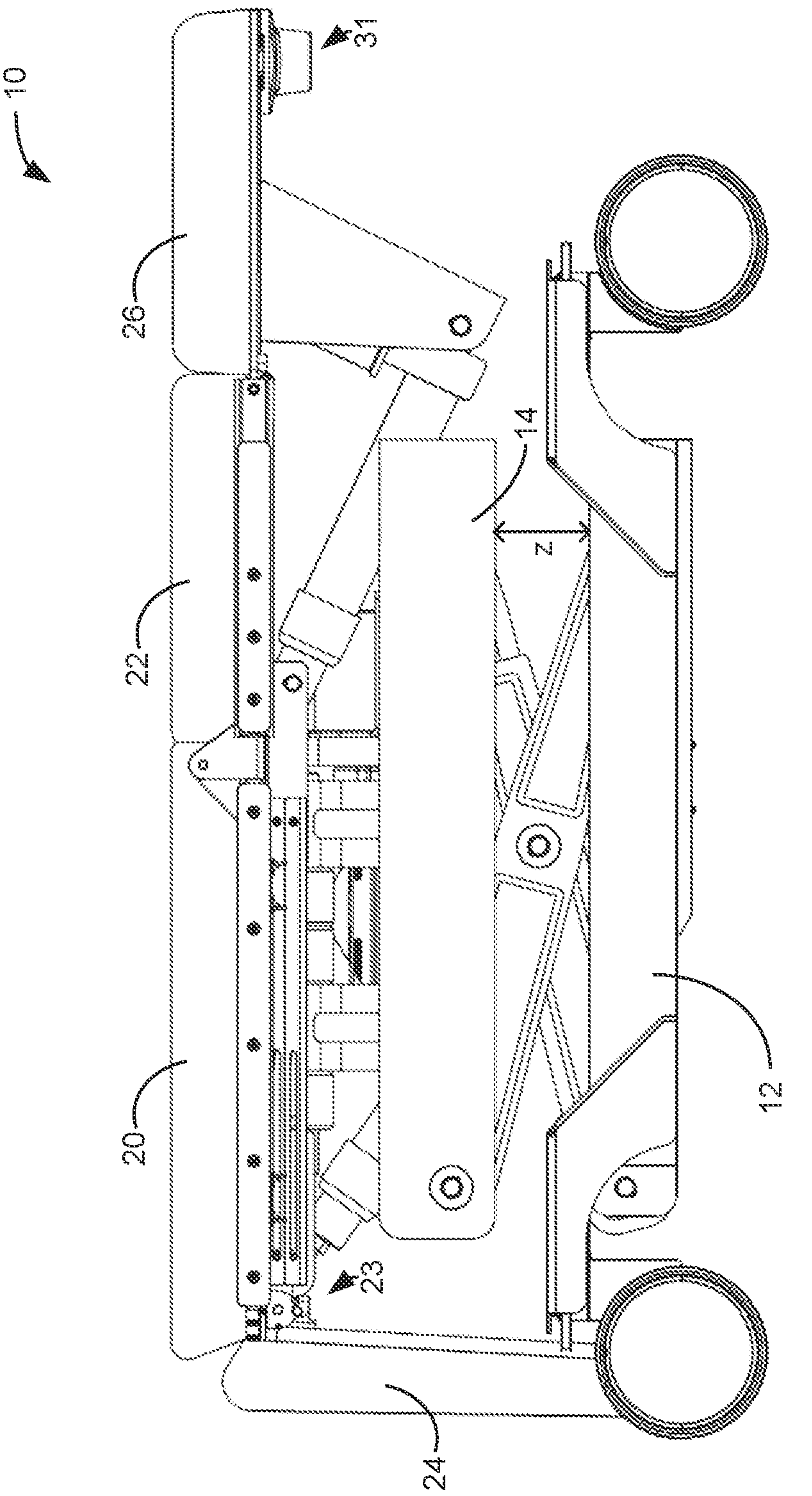
FIG. 6 shows the apparatus in a compact state, and in particular where the scissor lift motor has been controlled to minimize the height of the apparatus.

To move the leg support 24, a clinician can pull the handle 51 (to the right in FIG. 4A) to overcome the bias of spring 56. This frees the cross bar 52 from the notch 55 in which it is currently sitting, which in turn allows the cross bar 52 to rotate around the periphery of the cams 54. As this rotation occurs, the angle of the leg support 24 relative to the seat 20 changes. In FIG. 4C, the cross bar 52 has rotated to a point where it encounters another notch 55 in the periphery of the cams 54, and if the handle 51 is released by the clinician, the cross bar 52 will be biased by spring 56 into this notch, preventing further rotation of the leg support 24. The position of this notch 55 on the periphery of the cams 54 positions the leg support 24 at roughly 90 degrees relative to the seat 20 in FIGS. 4C and 4D. Although not precisely shown, the periphery of the cams 54 can include several notches 55, each allowing the leg support 24 to be positioned and affixed at different leg support angles between zero and a maximum leg support angle with respect to the seat 20 (e.g., 15°, 30°, 45°, 60°, 75°, 90°, 105°, 120°, etc.). The maximum leg support angle can comprise 60°, 90°, 120°or any other suitable maximum angle, although inclusion of a leg support angle of 90° is preferred to allow configuration of the apparatus 10 in a storage mode (FIG. 6). FIG. 1E for example shows both of the leg supports 24 being held by a particular notch 55 at approximately 45 degrees with respect to the seat 20.

As noted earlier, the zero-transfer patient apparatus 10 includes extendable safety rail mechanisms 130 comprising safety rails that extend vertically upwards, as explained further below. One of these mechanisms 130 is shown affixed underneath the seat 20 in FIG. 1E, and further details explaining its operation are shown with respect to FIGS. 5A-5C. The mechanism 130 can be manipulated by the clinician to extend safety rails at right (upward) angles to the seat 20, as explained further below. Safety rails are beneficial to secure the patient or related objects (charts, monitoring devices, etc.) in the apparatus 10, and also to provide clinicians handles to manipulate and move the apparatus 10 and the patient within the treating facility. In the example shown, safety rail mechanisms 130 are affixed underneath the seat 20. However, additional safety rail mechanisms 130' could also be affixed to the back 22 (FIG. 5A) if desired, although this isn't shown in the Figures.

Figure 5A:
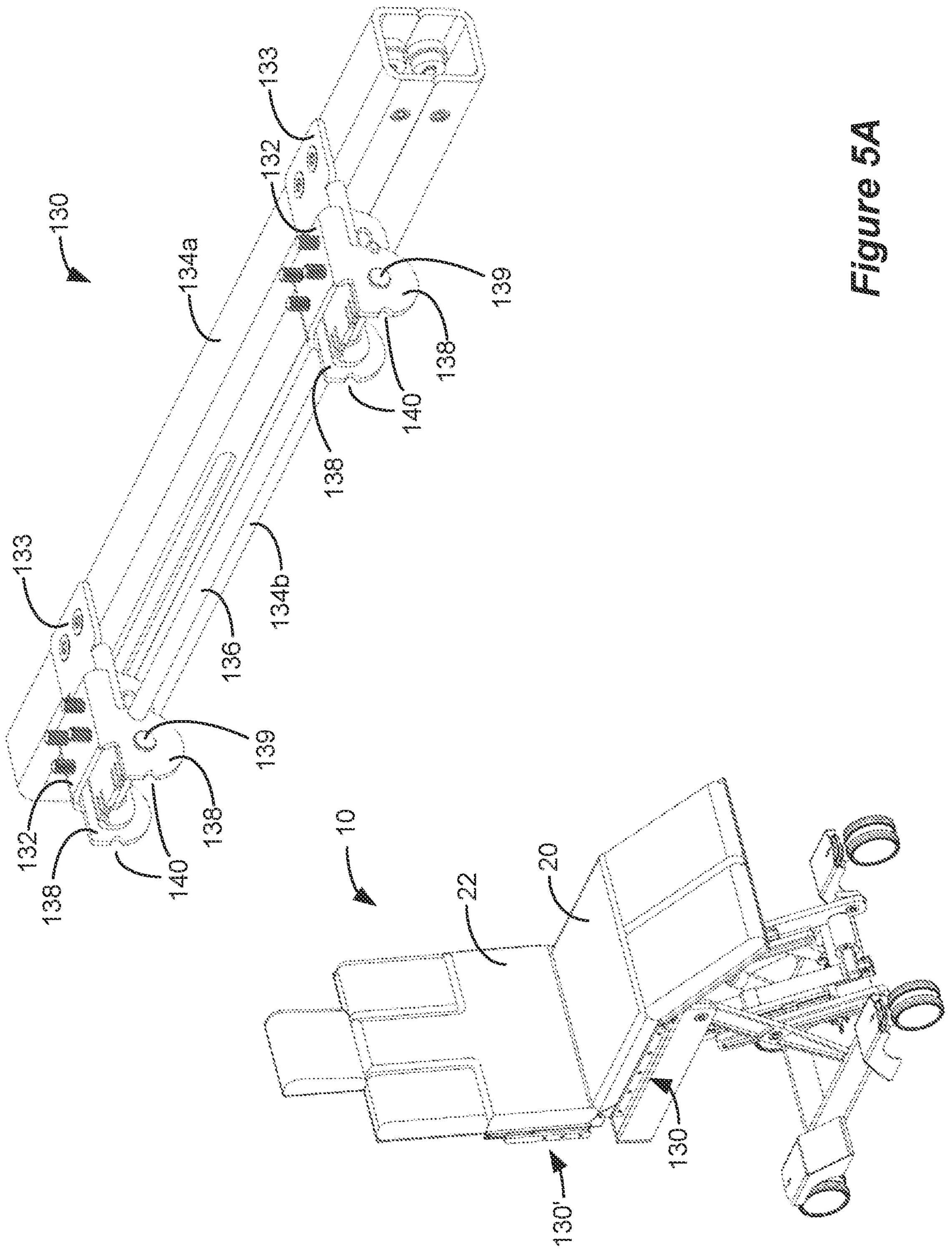
FIGS. 5A-5C show manners in which the right and left safety rails of the apparatus can be moved.

FIG. 5A shows further details of the safety rail mechanisms 130 and how they are bolted underneath by seat 20 at plates 132. These plates 132 includes cams 138, each of which includes two notches 140 spaced at approximately 180° around their generally semicircular peripheries. A handle 136 is spring biased (spring not shown) to a pivot rod 139, and currently rests within one of the notches 140 (which is visible in FIG. 5B). Handle 136 is held within a slot in a rotatable plate 133 which is rotationally affixed to the pivot rod 139. The rotatable plate 133 in turn is connected to safety rails 134*a* and 134*b*. In FIG. 5A, the safety rails 134*a* and 134*b* are tucked underneath the seat 20, and are essentially stored.

Figure 5B:
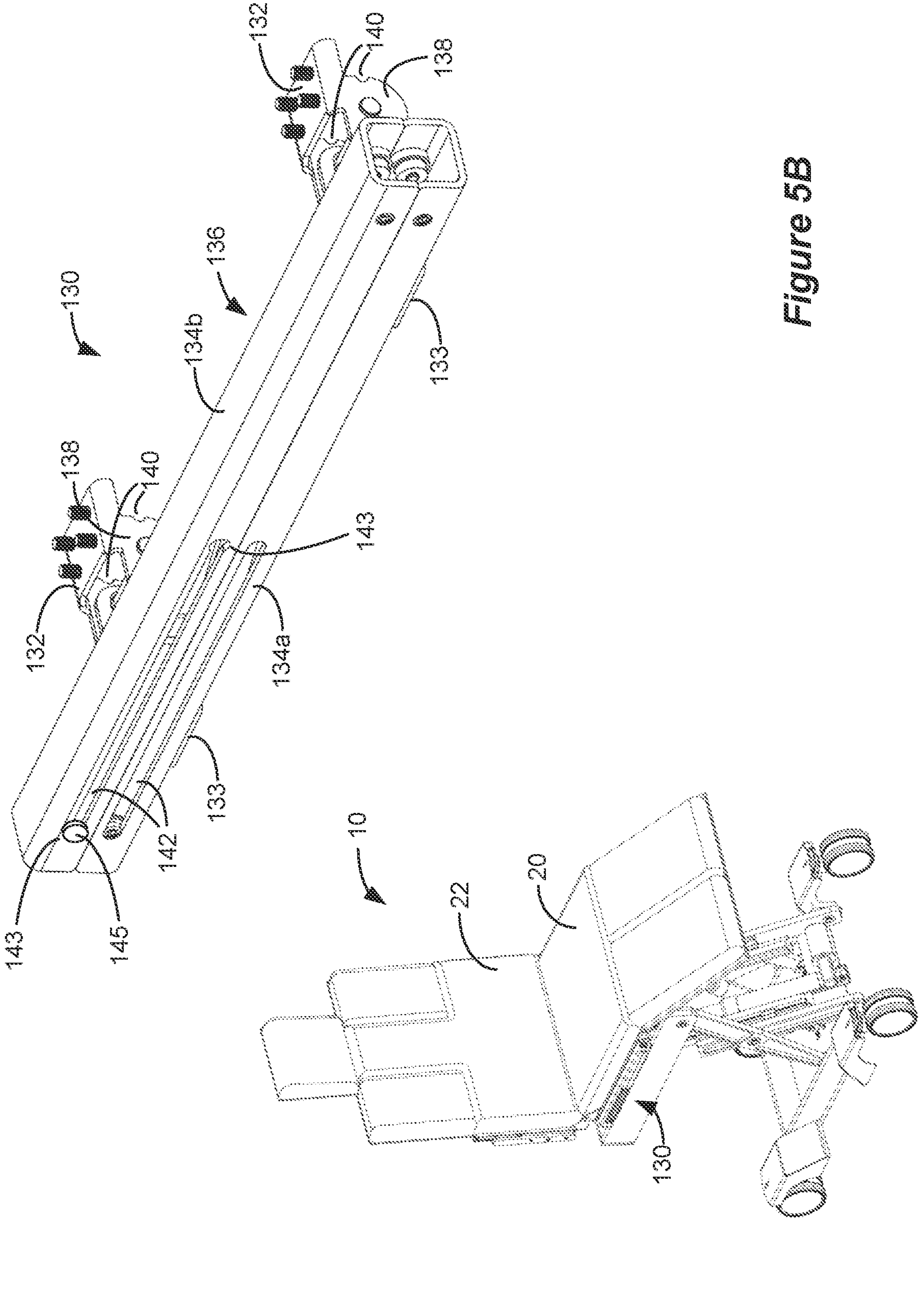
Figure 5C:
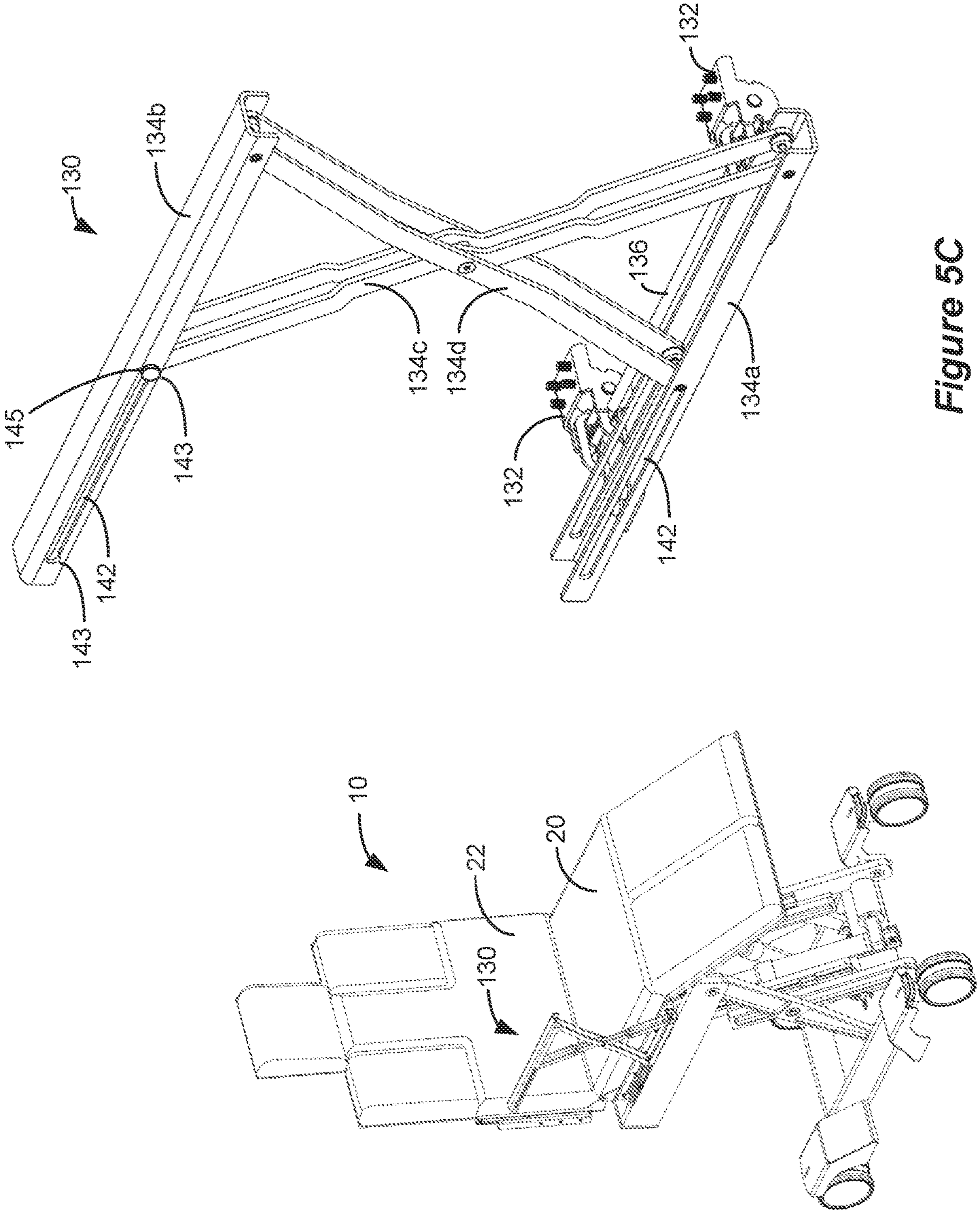

A clinician wishing to extend the safety rails 134*a* and 134*b* can manually manipulate the safety rail mechanism 130 in ways shown in FIGS. 5B and 5C. Starting first with FIG. 5B, the safety rails 134 *a* and 134 *b* are pivoted 180°to a position where they are clear of the edge of the seat 20 so that they can later be extended upwards (FIG. 5C). This pivoting occurs as follows. The clinician pushes the handle 136 (inward toward the center of the apparatus 10) to overcome the bias of the spring, which frees the handle 136 from its notch 140. This allows the rotatable plate 133 (including the handle 136 and the safety rails 134*a* and 134 *b*) to rotate 180° around the cams 138 to the position shown in FIG. 5B. At this point, the handle 136 is spring biased into the other notch 140 on the cams 138 (the one visible in FIG. 5A), which holds the rotatable plate 133 and the safety rails 134*a* and 134*b* in a firm position. Notice that the safety rails 134*a* and 134*b* include grooves 142. Groove 142 in rail 134*b* includes notches 143 at its ends. The outer notch 143 retains a button 145 in FIG. 5B. This button 145 is spring-connected to a cross member 134*c* which is currently folded within the rails 134*a* and 134*b* in FIG. 5B, but which is subsequently visible in FIG. 5C.

Once deployed as shown in FIG. 5B, safety rail 134*b* can be extended upwards away from safety rail 134*a*, as shown in FIG. 5C. As shown, the internal space of the safety rails 134*a* and 134*b* can include cross members 134*c* and 134*d*, the ends of which affix within grooves 142 on the rails to allow cross members 134*c* and 134*d* articulate in a scissor fashion as rail 134*b* is raised. The cross members 134*c* and 134*d* may also be considered as safety rails, because like rails 134*a* and 134*b* they help in retaining the patient and objects within the apparatus 10. When raising rail 134*b*, button 145 is pushed, which frees the button 145 from the outer notch 143, and allows the button to move through slot 142 to the inner notch 143. Once the button 145 reaches and is retained within inner notch 143 as shown in FIG. 5C, rail 134*b* will be firmly held in the extended position shown in FIG. 5C. FIG. 5C shows the safety rail mechanism 130 as extended on only one side of the zero-transfer patient apparatus 10, but of course the mechanism 130 on the other side could be extended as well. Once the safety rail mechanism 130 has been used and is no longer needed, it can be stored by pressing the button 145 to free it from the inner notch 143, which allows the button to move through the slot 142 as rail 134*b* moves downward towards 134*a* (as shown in FIG. 5B), until the button 145 eventually comes to rest in the outer notch 143, as shown in FIG. 5B. Thereafter, the clinician can pull handle 136 outward (away from the apparatus 10) to allow the rails to be rotated back under the seat 20 (as shown in FIG. 5A).

Components that are moveable in an automated fashion in the zero-transfer patient apparatus 10 are discussed next. As discussed earlier, automated motion of components in the apparatus 10 is affected by the use of various motors. Means of controlling such motors were discussed earlier (see FIG. 2).

A scissor lift mechanism 40, shown in various views in FIGS. 1A-1E, is used to change the height (z) of the apparatus by changing the height of the upper chassis 14 and the seat 20 relative to the lower chassis 12. Mechanism 40 includes a scissor lift motor 42 proximate to the lower chassis 12. The motor 42 is coupled to a scissor lift shaft 44 in a linear actuator, such that operating the motor 42 causes the shaft 44 to extend from, or retract into, a scissor lift shaft housing 43. An end 45 of shaft 44 (FIG. 1C) is rotatably attached via a coupling to a stationary shaft 167, where pillow blocks 166 attached to the underside of the seat 20 rotate (see FIG. 8A). Thus, as the shaft 44 extends, the seat 20 and the upper chassis 14 will also move upwards. As the shaft 44 moves, ends of scissor legs 46 move within tracks 50 in the lower chassis 12 (see FIGS. 1A, 1B) and in the upper chassis 14 (see FIG. 1E) to stabilize the z-axis movement of the upper chassis 14 relative to the lower chassis 12. The other ends of the scissor legs 46 are rotatably coupled to the upper chassis 14 at rotation point 150, and to the lower chassis 12 at rotation point 152 (FIG. 1C). FIGS. 1A-1E show the upper chassis 14 at a maximum height z relative to the lower chassis 12, that is, when the shaft 44 is fully extended out of the housing 43 by motor 42. FIG. 6, by contrast, shows the upper chassis 14 at a minimum height z relative to the lower chassis 12, that is, when the shaft 44 is fully retracted within the housing 43 by motor 42. This minimum height is particularly useful when storing or shipping the apparatus 10, as described next. Of course, the motor 42 can be controlled to establish any height z between these two extremes, and a minimum height practically useable when a patient is placed in the apparatus 10 may be larger than the minimum height shown in FIG. 6.

FIG. 6 also shows a useful configuration of the zero-transfer patient apparatus 10 as best for storage or shipping of the apparatus. Here, the scissor lift motor 42 has been controlled to minimize the distance z between the lower and upper chassis 12 and 14; longitudinal tilt motor 62, lateral tilt motor 82, and back tilt motor 102 (explained further below) are set to zero degrees; the leg supports 24 have been angled downward (e.g., 90°) at hinges 23; the shoulder supports 26 have been locked in place (using shoulder lock knobs 31); and the head support 28 has been removed (using head support adjustment mechanism 27, see FIG. 3C). This renders the apparatus 10 into a compact shape that is easily to store and ship.

Figure 7A:
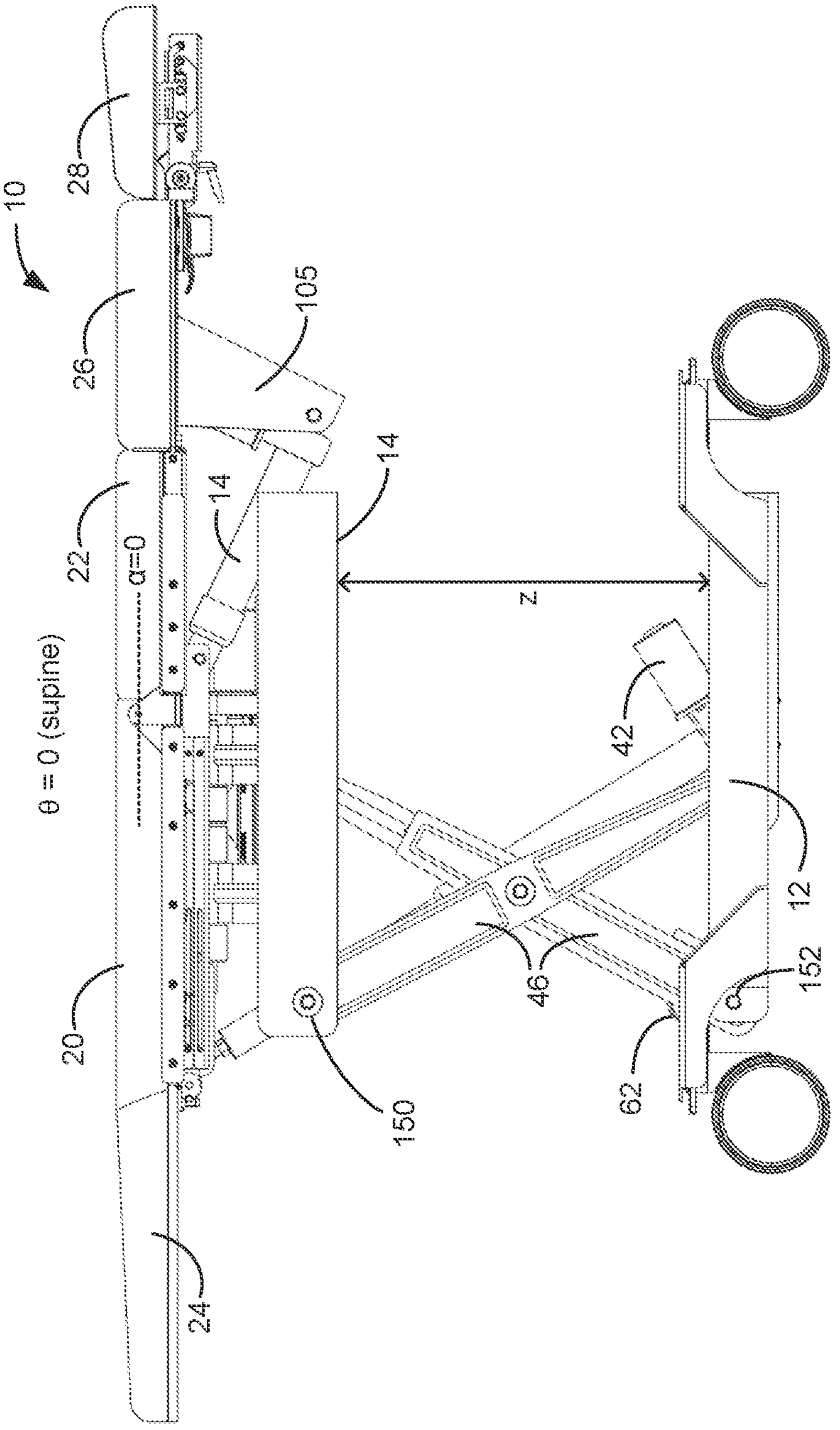
FIGS. 7A-7D show control of the longitudinal tilt motor to adjust a longitudinal tilt angle of the apparatus.
Figure 7B:
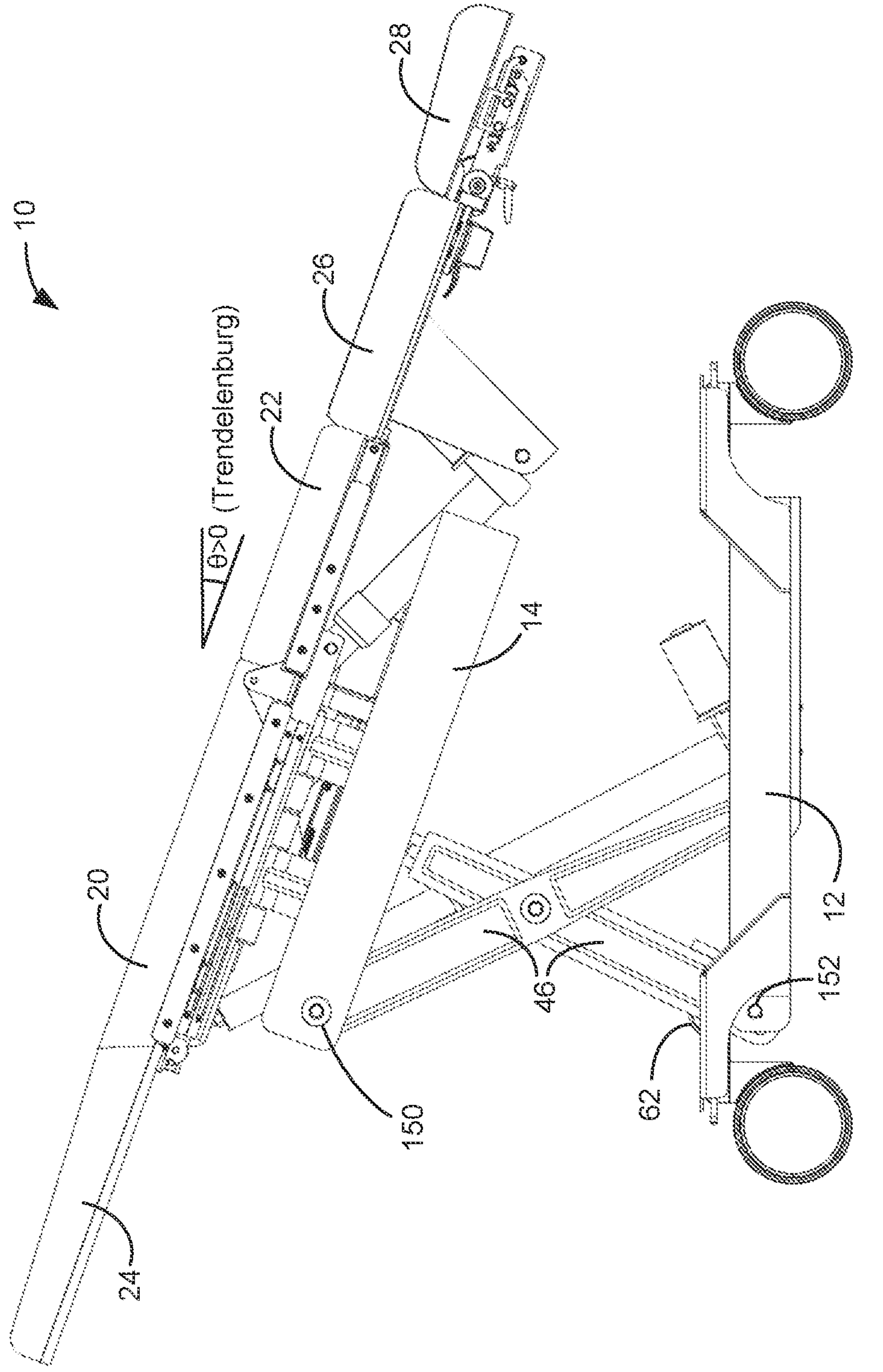

FIGS. 7A-7D show control of longitudinal tilt motor 62 to change the longitudinal tilt (head to toe) angle θ of a patient in the zero-transfer patient apparatus 10. As shown in various views in FIGS. 1A-1E, motor 62 includes a longitudinal tilt shaft 64 and a longitudinal tilt shaft housing 63. The end of the shaft 64 is rotatably coupled to the underside of the upper chassis 14 at a coupling 65 (FIG. 1E). When the motor 62 is controlled to retract the shaft 64 into the housing 63, the coupling 65 pulls the underside of the upper chassis 14 downward, thus allowing the upper chassis to rotate relative to the rotation point 150 to which the outside scissor legs 46 are connected. This increases longitudinal tilt angle θ (e.g., makes it positive), as shown in FIG. 7B, which generally rotates the seat 20 backward from the patient's perspective. If the apparatus 10 is configured as a bed as shown in FIG. 7B, this will lower the patient's head with respect to his feet, in what is known as a Trendelenburg position. The inner scissor legs 46 coupled to rotation point 152 can rotate and may move in tracks 50 in the upper chassis 14 (FIG. 1E) to accommodate this change in angle.

Figure 7C:
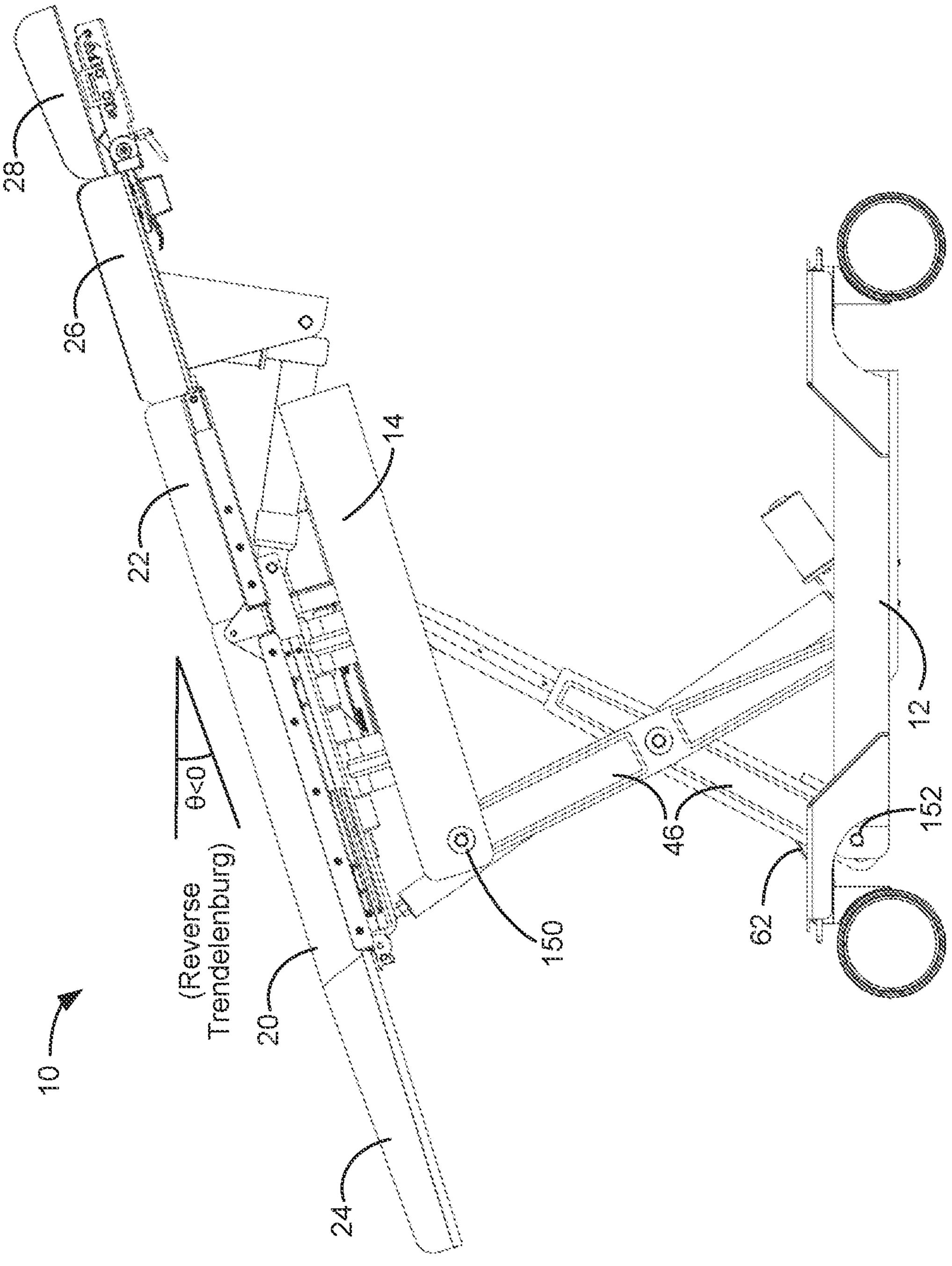

Likewise, when the motor 62 is controlled to extend the shaft 64 from the housing 63, the coupling 65 pushes the underside of the upper chassis 14 upward, thus allowing the upper chassis to rotate relative to the rotation point 150. This decreases the longitudinal angle θ (e.g., makes it negative), as shown in FIG. 7C, which generally rotates the seat 20 forward. If the apparatus 10 is configured as a bed as shown in FIG. 7C, this will raise the patient's head with respect to his feet, in what is known as a reverse Trendelenburg position. As before the inner scissor legs 46 can rotate (152) and may move in tracks 50 in the upper chassis 14 to accommodate this change in angle. Although not shown in FIG. 7C, the leg supports 24 may be angled downward to allow the patient's lower legs to drop, as discussed earlier with reference to FIGS. 4A-4D. In both the Trendelenburg and reverse Trendelenburg modes, the seat 20 and back 22 are substantially parallel ($\alpha \sim 0$).

Figure 7D:
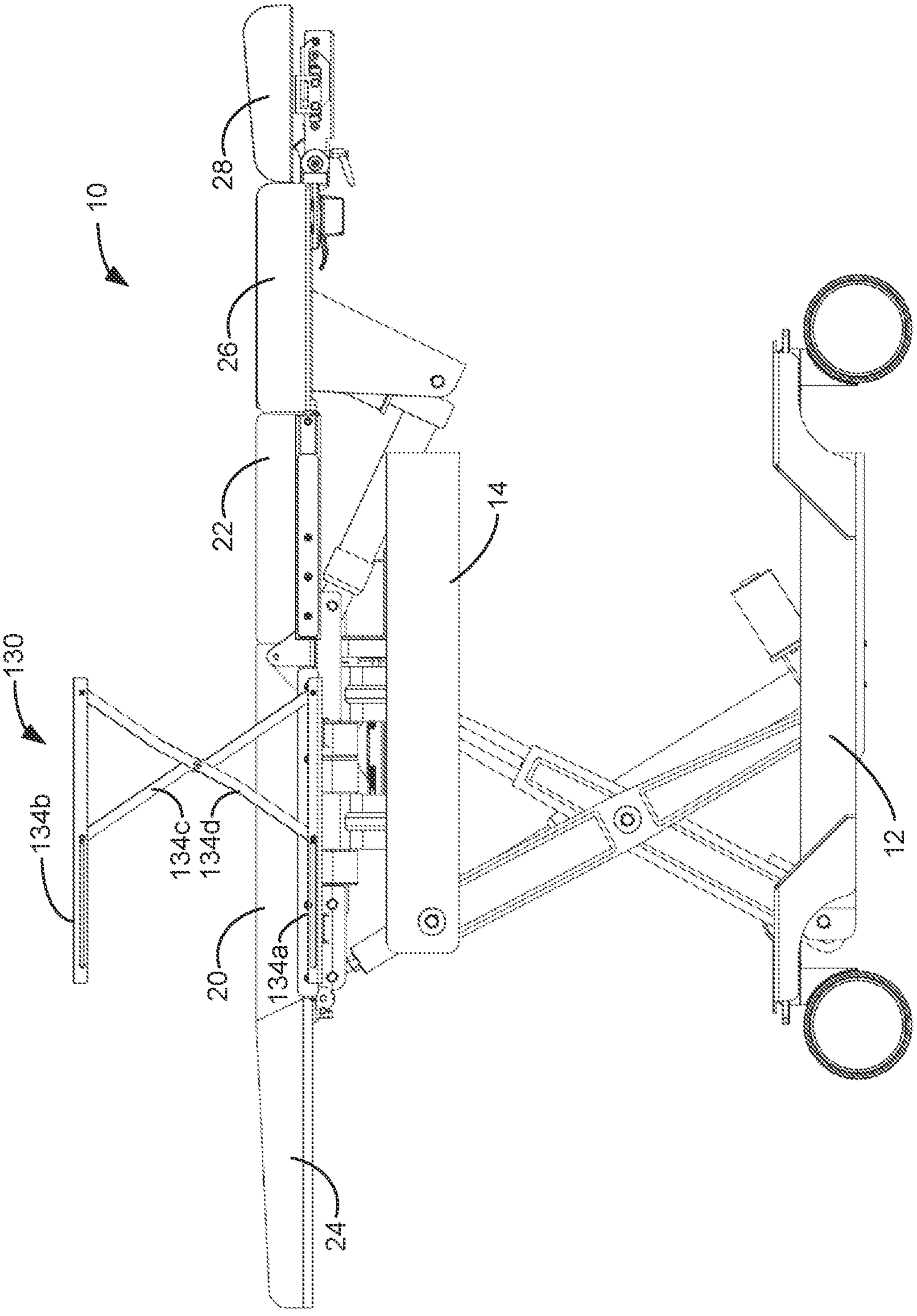

When the motor 62 is controlled to partially extend the shaft 64 from the housing 63, the longitudinal angle θ can be set to an intermediate value, as shown in FIG. 7A. In this circumstance, the patient's head and feet will be level, establishing a supine position in which the seat 20 and back 22 are substantially parallel ($\alpha \sim 0$) and are longitudinally inclined at a substantially horizontal longitudinal tilt angle (e.g., $\theta=0$). This supine position is most logical to use when the zero-transfer patient apparatus 10 is configured as an operating room table, or a pre-op or post-op bed. This supine position ($\theta=0$) is also logical to use when the zero-transfer patient apparatus 10 is configured as a gurney, as shown in FIG. 7D. When configured as a gurney, it can be most useful to extend the safety rails 134*a-d* of the safety rail mechanisms 130 to protect the patient from falling from the apparatus 10 and to provide clinicians handles to move the apparatus 10, as described previously. Although not shown, other adjustments to the apparatus 10 described earlier can be made when in the supine mode. For example, the head support 28, leg supports 24, or shoulder supports 26 could be adjusted, a lateral tilt angle φ could be established, the height z of the apparatus 10 (as controlled by scissor lift motor 42) could be changed or maximized (FIG. 7A), etc.

Figure 8A:
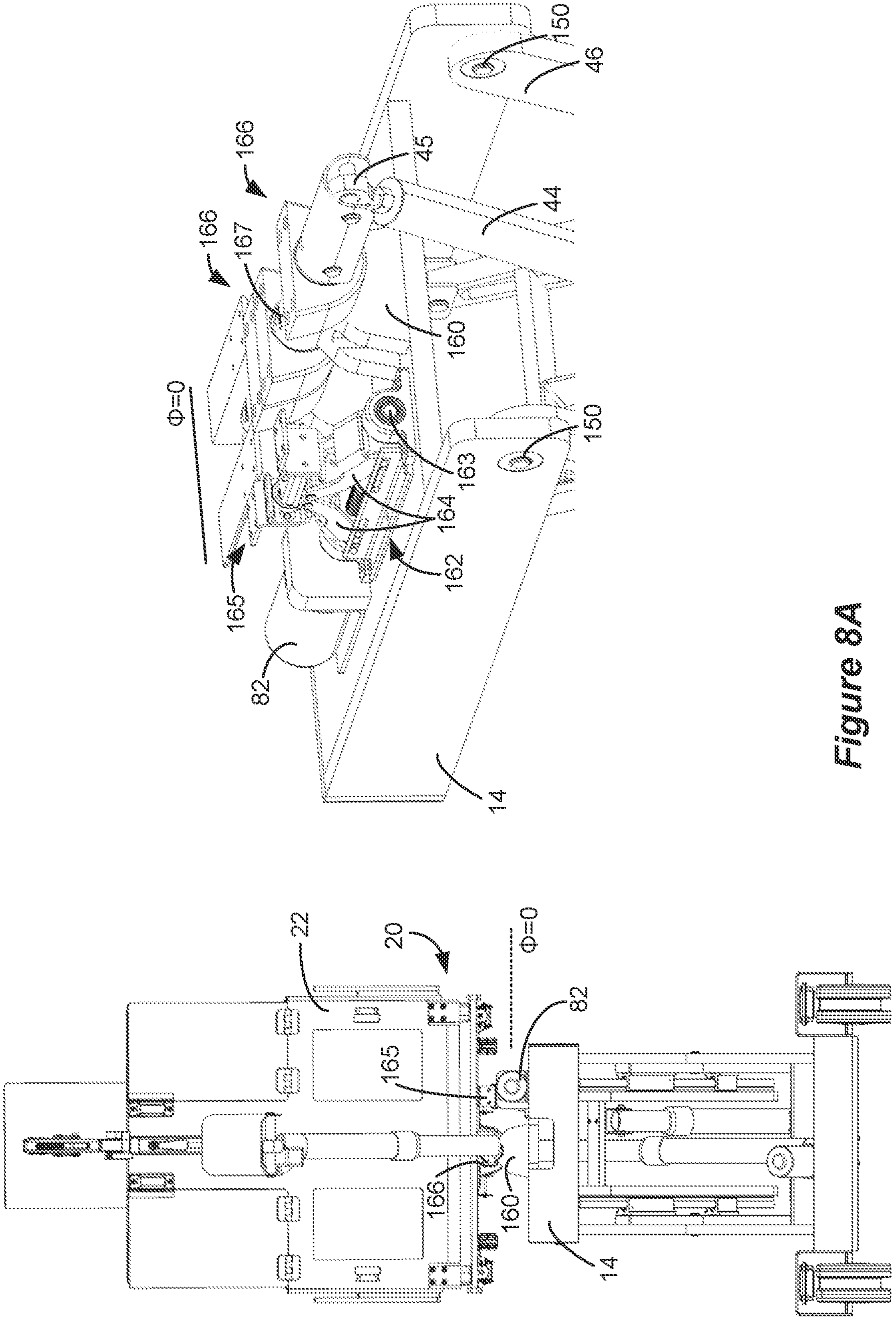
Figure 8C:
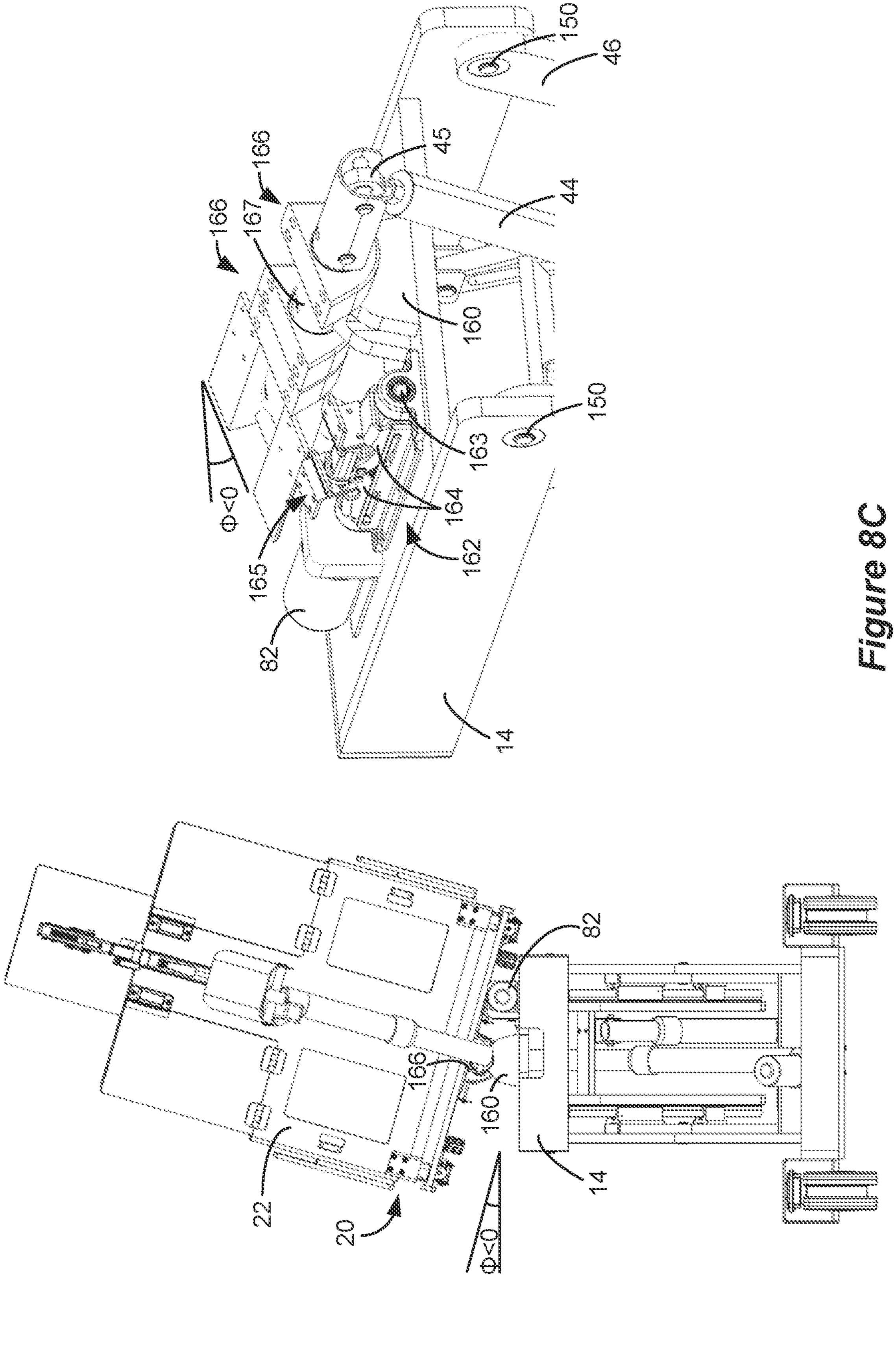

FIGS. 8A-8C show control of lateral tilt motor 82 to change the lateral tilt (left to right) angle φ of a patient in the zero-transfer patient apparatus 10, which inclines the seat 20 and back 22 at a substantially non-horizontal lateral tilt angle. FIGS. 8A-8C show the apparatus 10 from the back, and in an isometric view with the seat 20 removed so that the various connecting parts between the seat 20 and the upper chassis 14 can be appreciated. As shown, the motor 82 turns a power screw 163 which operates a scissor jack 162 mounted to the upper chassis 14. When the screw 163 turns in a given direction, arms 164 of the scissor jack 163 will either extend (FIG. 8B) or retract (FIG. 8C), which raises or lowers a rotatable coupling 165 at the top of the jack. This coupling 165 is attached to the bottom of the seat 20. The seat 20 in turn is connected to a pillow block 166 rotatable around a shaft 167 that is laterally centered in the apparatus via spacers 160 affixed to the upper chassis 14. Thus, when the motor 82 controls the scissor jack 163 to extend, the seat 20 is pushed up, and rotates the pillow block 166 around the shaft 167 and within the spacers 160, thus titling the chair to the left in FIG. 8B ($\varphi>0$). When the motor 82 controls the scissor jack 163 to retract, the seat 20 is pulled down and rotates in the other direction, thus titling the chair to the right in FIG. 8C ($\varphi<0$). In an intermediate state, the seat 20 is level, as shown in FIG. 8A ($\varphi=0$). Lateral tilting of the apparatus 10 via motor 82, while not strictly necessary, is beneficial, particularly during surgery, as this may help the clinician better access the patient depending on the surgery that is being performed.

Back tilt motor 102 as mentioned previously can be used to change the recline angle $\alpha$ of the back 22 with respect to the seat 20 (FIG. 1C). As shown in various views in FIGS. 1A-1E, motor 102 includes a back tilt shaft 104 and a longitudinal tilt shaft housing 103. The motor 102 is affixed to the back 22, and is optionally protected by a cover 105. The end of the shaft 104 is rotatably coupled to the upper chassis 14 at a coupling 106 (FIG. 1D). When the motor 102 is controlled to retract the shaft 104 into the housing 103, the back 22 is pulled more parallel with the seat 20, and angle = decreases. When the shaft 104 is fully retracted within the housing 103, the back 22 is perfectly parallel with the seat ($\alpha=0$). This flat condition ($\alpha=0$) is most logical to use when the zero-transfer patient apparatus 10 is configured as an operating room table (e.g., FIG. 7A) or as a gurney (e.g., FIG. 7D). That being said, a small non-zero recline angle $\alpha$ may also be used for patient comfort. When the shaft 104 is fully extended from the housing 103, the back 22 will essentially be perpendicular with the seat 20 ($\alpha\sim90°$). This perpendicular condition ($\alpha\sim90°$) is most logical to use when the zero-transfer patient apparatus 10 is configured as a wheelchair (e.g., FIG. 1C). Again, a recline angle less than perpendicular ($\alpha<90°$) may promote patient comfort.

Figure 9B:
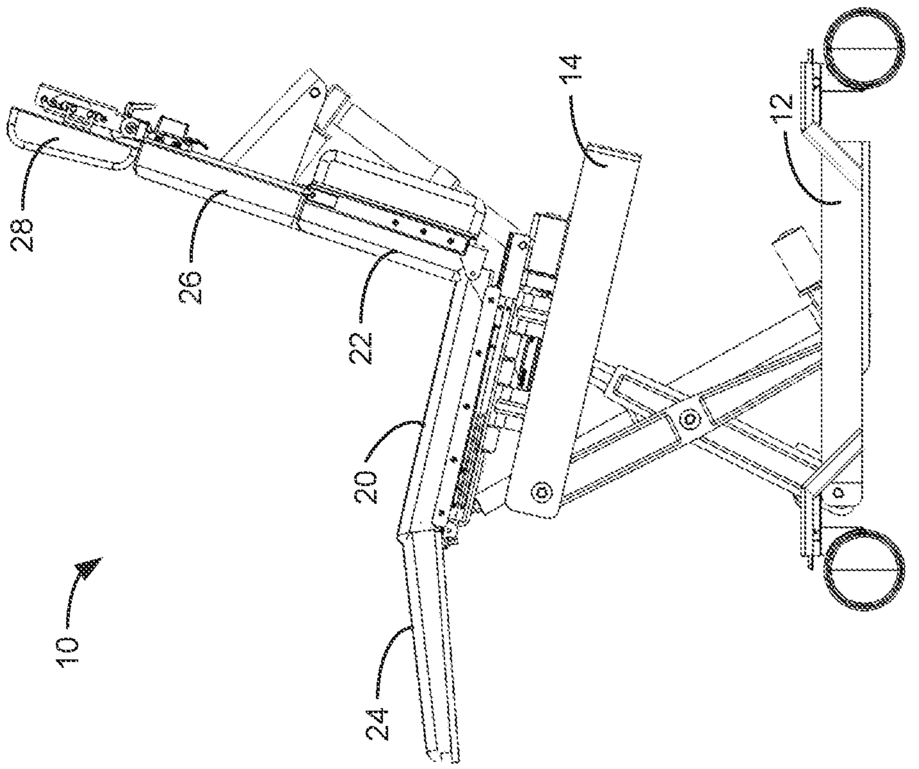
FIGS. 9A and 9B show the apparatus as configured into a wheelchair and in a beach chair mode.
Figure 9A:
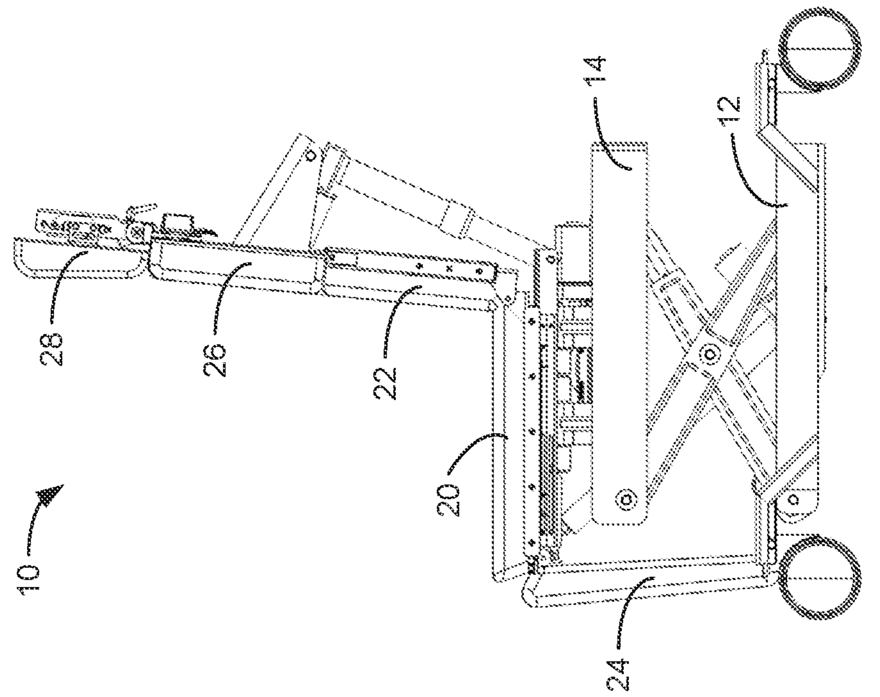

Each of the manners in which the zero-transfer patient apparatus 10 can be moved or adjusted—whether manually or automatically—are independent of each other, and therefore the apparatus 10 is moveable into many different configurations that assist in marshalling patients through the entirety of their stay at a treating facility. Some of these configurations of the apparatus have already been shown. FIG. 9A shows configuration of the apparatus in a wheelchair mode, in which the height (z) has been adjusted downward, and the leg supports 24 have been released. In the wheelchair mode, the seat 20 is substantially horizontal ($\theta=0$) and the back 22 is configured at a substantially vertical recline angle with respect to the seat ($\theta=0$). Although not shown, other adjustments can be made as well: for example, lateral tilt angle ($\varphi$) (currently set to zero) could be changed; the head support 28 could be adjusted (or removed); the safety rails 130 could be extended; one or more of the shoulder supports 26 could be moved or removed, etc. FIG. 9B shows some of these adjustments, in what may be referred to as a beach chair mode. In this mode, the longitudinal tilt angle ($\theta$) has been adjusted (positively) to tilt the chair backwards, and the back 22 is substantially perpendicular with the seat ($\alpha=0$). The leg supports 24 may also be adjusted to a shallow (non-zero) angle. This is generally a comfortable position for the patient, and may also place the patient in a good position for examination by a treating clinician.

As previously mentioned, the apparatus 10 can also be configured to lay generally flat as a bed, which is generally useful when configured as an operating room table (FIG. 7A) or as a gurney (FIG. 7D). Again, the longitudinal tilt angle ($\theta$) (see FIGS. 7B and 7C) or the lateral tilt angle ($\varphi$) (both currently set to zero) could be changed as well. Because the zero-transfer patient apparatus 10 is transformable in these manners, it can be used to transport the patient through all facets of a stay in a treating facility, which as noted earlier improves efficiency, safety, and cost. As also previously discussed, the apparatus 10 can also be configured in a compact fashion facilitating storage and transport (FIG. 6).

The various angles at which components of the zero-transfer patient apparatus 10 can be oriented with respect to each other, or to horizontal or vertical positions, are said to be "substantially" at these angles (e.g., "substantially perpendicular"), if such angles vary +/−5 degrees with respect to such positions (e.g., components are "substantially perpendicular" if angled at or between 85-95 degrees with respect to each other).

Although particular embodiments of the present invention have been shown and described, the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A patient apparatus for use in a medical treatment facility, comprising:

a seat coupled to an upper chassis;

a back coupled to the seat;

left and right shoulder supports coupled to the back, wherein the left and right shoulder supports are each independently configurable to either cover or expose a patient's left or right shoulder respectively;

a lower chassis coupled to the upper chassis and comprising casters allowing the apparatus to be rolled;

a first motor configured to adjust a recline angle between the back and the seat;

a second motor configured to adjust a vertical height of the seat;

a third motor configured to adjust a longitudinal tilt angle of the seat; and a fourth motor configured to adjust a lateral tilt angle of the seat.

2. The apparatus of claim 1, further comprising left and right leg supports coupled to the seat.

3. The apparatus of claim 2, wherein the left and right leg supports are each independently configurable to establish a leg support angle of zero degrees and a maximum leg support angle between the seat and the leg support.

4. The apparatus of claim 3, wherein the left and right leg supports are each independently configurable to establish at least one other leg support angle between zero degrees and the maximum leg support angle.

5. The apparatus of claim 3, wherein the left and right leg supports are each independently manually configurable to establish the leg support angle.

6. The apparatus of claim 1, wherein the left and right shoulder supports are coupled to the back by hinges.

7. The apparatus of claim 6, wherein the left and right shoulder supports are locked to the back when covering the patient's left or right shoulder respectively, and wherein the left and right shoulder supports are unlocked to the back and bend at the hinge when exposing the patient's left or right shoulder respectively.

8. The apparatus of claim 1, further comprising a head support coupleable to the back.

9. The apparatus of claim 8, wherein the head support is configurable to (i) adjust a distance between the head support and the back, and/or (ii) adjust an anterior position of the head support with respect to the back.

10. The apparatus of claim 8, wherein the head support is removable from the back.

11. The apparatus of claim 1, further comprising left and right safety rail mechanisms configured to extend vertically upwards at left and right edges of the seat respectively.

12. The apparatus of claim 11, wherein the left and right safety rail mechanisms are affixed underneath the seat.

13. The apparatus of claim 1, further comprising an electronics module comprising control circuitry to control operation of the first, second, third and fourth motors.

14. The apparatus of claim 13, wherein the electronics module comprises telemetry circuitry configured to wirelessly communicate with a computing device to allow the apparatus to be controlled by the computing device, or to allow the apparatus to report information to the computing device.

15. The apparatus of claim 1, wherein the lower chassis is coupled to the upper chassis by a scissor lift mechanism.

16. The apparatus of claim 15, wherein the second motor is configured to adjust the vertical height of the seat by vertically extending or retracting the scissor lift mechanism.

17. The apparatus of claim 16, wherein the third motor is configured to adjust the longitudinal tilt angle of the seat by rotating the seat around a rotation point coupled to the scissor lift mechanism.

18. The apparatus of claim 1, wherein the fourth motor is configured to adjust the lateral tilt angle of the seat via a scissor jack coupled to an underside of the seat.

19. A patient apparatus for use in a medical treatment facility, comprising:

a seat coupled to an upper chassis;

a back coupled to the seat;

a lower chassis coupled to the upper chassis by a scissor lift mechanism and comprising casters allowing the apparatus to be rolled;

a first motor configured to adjust a recline angle between the back and the seat;

a second motor configured to adjust a vertical height of the seat by vertically extending or retracting the scissor lift mechanism;

a third motor configured to adjust a longitudinal tilt angle of the seat by rotating the seat around a rotation point coupled to the scissor lift mechanism; and a fourth motor configured to adjust a lateral tilt angle of the seat.

* * * * *